(12) United States Patent
Moore et al.

(10) Patent No.: US 12,222,519 B2
(45) Date of Patent: Feb. 11, 2025

(54) LIGHT ENGINE SYSTEMS AND METHODS FOR COMBINING LOW AND HIGH ETENDUE LIGHT

(71) Applicant: Stryker Corporation, Kalamazoo, MI (US)

(72) Inventors: Frederick Allen Moore, Vancouver (CA); Robert Anthony Stead, North Vancouver (CA); Lesley Myron Otsig, New Westminster (CA)

(73) Assignee: Stryker Corporation, Portage, MI (US)

( * ) Notice: Subject to any disclaimer, the term of this patent is extended or adjusted under 35 U.S.C. 154(b) by 712 days.

(21) Appl. No.: 17/396,201

(22) Filed: Aug. 6, 2021

(65) Prior Publication Data

US 2022/0043274 A1 Feb. 10, 2022

Related U.S. Application Data

(60) Provisional application No. 63/063,071, filed on Aug. 7, 2020.

(51) Int. Cl.
*G02B 27/09* (2006.01)
*F21V 8/00* (2006.01)
*G03B 21/20* (2006.01)

(52) U.S. Cl.
CPC ....... *G02B 27/0994* (2013.01); *G02B 6/0006* (2013.01); *G03B 21/208* (2013.01)

(58) Field of Classification Search
CPC . G02B 27/0994; G02B 6/0006; G03B 21/208
USPC .......................................................... 353/31
See application file for complete search history.

(56) References Cited

U.S. PATENT DOCUMENTS

| | | |
|---|---|---|
| 2005/0013132 A1* | 1/2005 | Kim ....................... H04N 9/315 362/240 |
| 2006/0001863 A1 | 1/2006 | Kishida |
| 2010/0168515 A1 | 7/2010 | Sugimoto |
| 2011/0043898 A1 | 2/2011 | Gruensteidl |
| 2011/0199582 A1 | 8/2011 | Kuriki |

FOREIGN PATENT DOCUMENTS

| | | | |
|---|---|---|---|
| DE | 112015002455 T5 * | 3/2017 | ............ A61B 1/06 |
| JP | 2000-186998 A | 7/2000 | |

OTHER PUBLICATIONS

Translation of 112015002455 (Year: 2024).*

(Continued)

*Primary Examiner* — Jerry L Brooks
(74) *Attorney, Agent, or Firm* — Morrison & Foerster LLP

(57) ABSTRACT

A first light source with a first etendue generates a first light beam to travel along a first optical path having an expanded portion formed by a collector optical system. A second light source having a second etendue less than one tenth of the first etendue forms second light, which is conducted by a light guide having a distal section with an end face. The second light is emitted from the end face as a second light beam that travels over a second optical path that resides within the expanded portion of the first optical path due to the light guide being disposed relative to the first optical path from an off-axis direction. An optical condenser receives and directs the first and second light beams to a common exit plane to form the combined light beam.

17 Claims, 27 Drawing Sheets

(56) References Cited

OTHER PUBLICATIONS

International Preliminary Report on Patentability mailed Feb. 16, 2023, directed to International Application No. PCT/US2021/045066; 12 pages.
International Search Report and Written Opinion mailed Feb. 22, 2022, directed to International Application No. PCT/US2021/045066; 18 pages.
Invitation to Pay Fees mailed Nov. 24, 2021, directed to International Application No. PCT/US2021/045066; 11 pages.

* cited by examiner

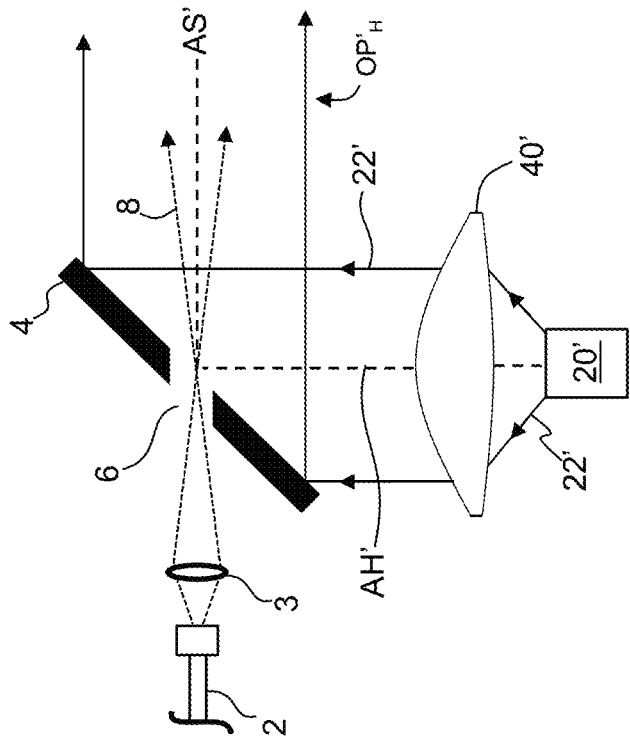
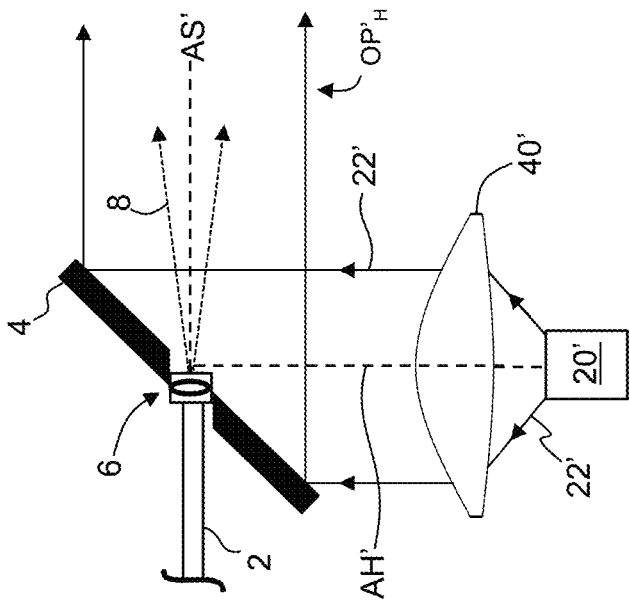
FIG. 7B PRIOR ART
FIG. 7A PRIOR ART

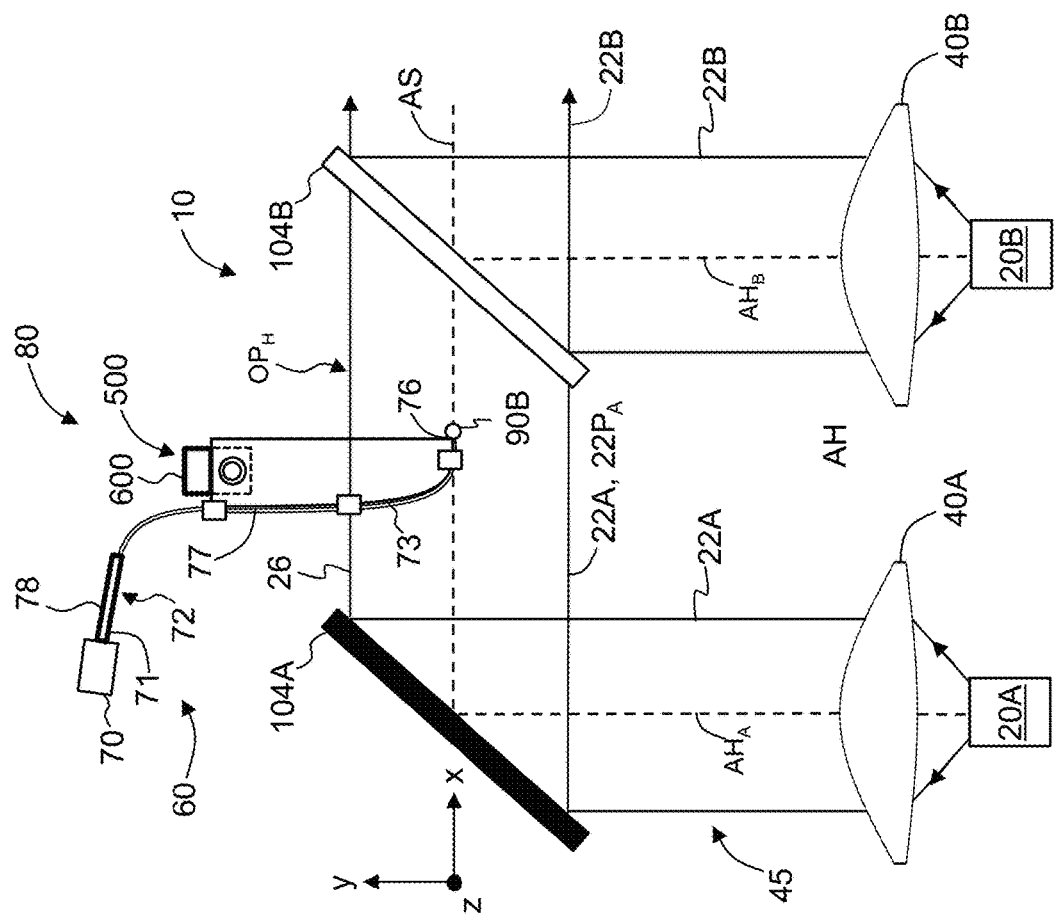
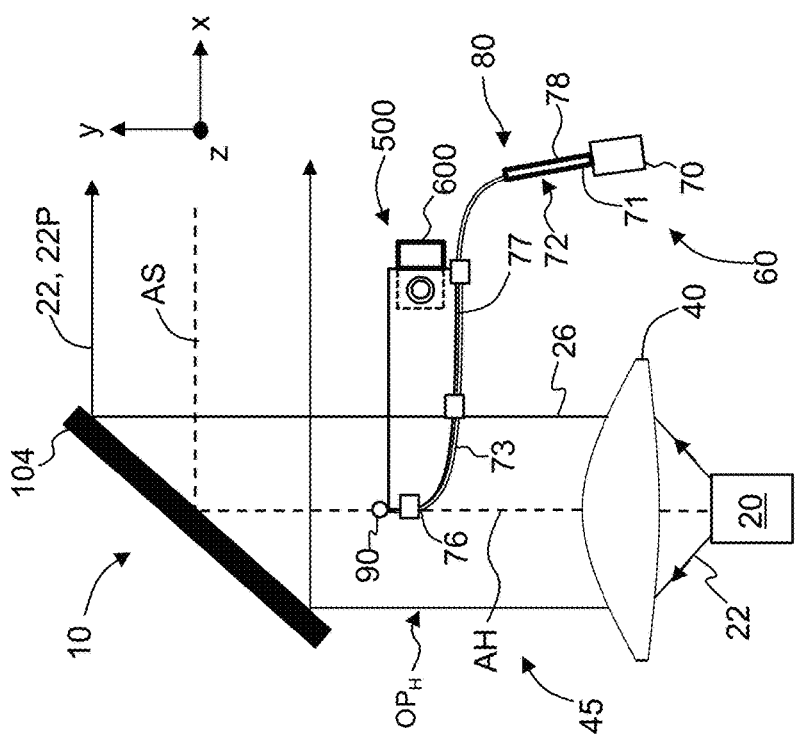
FIG. 8B
FIG. 8A

LIGHT ENGINE SYSTEMS AND METHODS FOR COMBINING LOW AND HIGH ETENDUE LIGHT

CROSS-REFERENCE TO RELATED APPLICATIONS

This application claims the benefit of U.S. Provisional Application No. 63/063,071, filed Aug. 7, 2020, the entire contents of which are hereby incorporated by reference herein.

FIELD

The present disclosure relates generally to light engine systems and methods, and more particularly to light engine systems and methods for combining low and high etendue light.

BACKGROUND

Multi-spectral light (also called polychromatic light) is light that contains more than a single wavelength. Multi-spectral light has a variety of commercial uses, including for displays, medical devices, spectral analysis devices, and the like, wherein such devices are referred to herein as "multi-spectral devices."

Some types of multi-spectral light can be generated in a multi-spectral light engine by using a single light source. For example, there are commercially available broadband light-emitting diodes (LEDs) that emit multi-spectral light over a wavelength band from 400 nm to 1100 nm (visible and near infrared (NIR)). Other types of multi-spectral light engines combine multiple light beams from multiple light sources that each emit light over different wavelength bands to form the multi-spectral light. For example, the light (beams) from red (R), green (G) and blue (B) light sources can be combined in select ways (referred to as "color addition") to form different types of "white" (W) light in a combined light beam.

There is increasing demand for providing multi-spectral light with select spectral characteristics to improve and expand the capabilities of multi-spectral devices. For example, there is demand for greater flexibility when performing fluorescence imaging in certain multi-spectral medical devices such as laparoscopes and endoscopes. This may require having to combine light from very different types of light sources, such as LED light sources, optical fiber-based light sources ("fiber light sources"), laser diodes, etc. having very different light emission characteristics, including emission wavelength and etendue.

SUMMARY

Aspects of the disclosure are directed to a first aspect of a light engine for generating a combined light beam, comprising: a) a first light source having an emission surface and a first etendue and configured to emit a diverging first light beam; b) a collector optical system arranged to receive the diverging first light beam and form therefrom an expanded first light beam that travels over a first expanded optical path that includes a periphery; c) a second light source having a second etendue that is less than one tenth of the first etendue and that is configured to form second light; d) a light guide having a proximal end section in optical communication with the first light source and having a distal end section that enters the first expanded optical path through the periphery, the distal end section having an end face, the light guide configured to conduct the second light from the second light source and emit the second light from the end face as a second light beam that travels over a second optical path that resides within the periphery of the first expanded optical path of the first light beam without passing either the second light or the second light beam through an aperture in a light redirecting element; and e) an optical condenser configured to receive and direct the first light beam and the second light beam to a common exit plane to form the combined light beam. Additional aspects of the light engine system include any and all of the following aspects in any combination, including by way of example the combinations as presented: a second aspect according to the first aspect wherein the common exit plane comprises an exit aperture; a third aspect according to the first and second aspects, wherein the light guide comprises an optical fiber; A fourth aspect according to the first and second aspects, wherein the light guide comprises a prism. A fifth aspect according to the first and second aspects, wherein the light guide comprises a light pipe. A sixth aspect according to any of the first through fifth aspects, wherein the expanded optical path resides along a first axis and the light guide intersects the first optical path from an off-axis direction relative to the first axis. A seventh aspect according to any of the first through sixth aspects, wherein the light guide comprises an optical fiber having a distal fiber section, wherein the end face comprises a fiber end face, and further comprising a support structure that operably supports at least the distal fiber section of the optical fiber so that the fiber end face resides within the first optical path. An eighth aspect according to the seventh aspect, wherein the support structure blocks less than 3% of the first light beam. A ninth aspect according to the seventh or eighth aspect, wherein the support structure comprises a thin planar support member having a fiber support edge and defining a plane and wherein the optical fiber is supported at or proximate to the fiber support edge and resides within the plane. A tenth aspect according to the ninth aspect, wherein the optical fiber has a diameter and wherein the thin planar support member has a width the same as or less than the diameter of the optical fiber. An eleventh aspect according any of the seventh through tenth aspects, wherein the support structure maintains a bend in the optical fiber. A twelfth aspect according to any of the seventh through eleventh aspects, wherein the support structure is adjustable to adjust at least one of a position and an orientation of the fiber end face within the first optical path. A thirteenth aspect according to any of the first through twelfth aspects, wherein the fiber end face resides on the first axis and faces the optical condenser. A fourteenth aspect according to any of the first through thirteenth aspects, wherein the second light beam emitted from the end face has a first beam angle and further comprising an optical component that resides at or proximate the end face and that is configured to change the first beam angle. A fifteenth aspect according to any of the first through fourteenth aspects, wherein the first and second light beams have respective first and second wavelength bands, and wherein the first and second wavelength bands are non-overlapping. A sixteenth aspect according to any of the first through fifteenth aspects, wherein the collector optical system and condenser optical system are axially spaced apart by an axial distance AXD, and wherein the end face of the distal section of the light guide resides between the collector optical system and the condenser optical system and is axially spaced apart from the collector optical system by an axial distance of at least 0.25·AXD.

A twenty-first aspect of the disclosure is directed to a light engine system for generating a combined light beam, comprising: a) a first light source having a first etendue and an emission surface and configured to introduce a first light beam to travel along at least a first axis and along a first optical path having an expanded portion; b) a second light source having a second etendue that is less than one tenth of the first etendue and that is configured to form second light; c) a light guide having a distal section with an end face and configured to conduct the second light and emit the second light from the end face as a second light beam, wherein the second light beam is introduced to travel over a second optical path that resides within the expanded portion of the first optical path of the first light beam by the light guide being disposed relative to the first optical path and in an off-axis direction relative to the first axis; and d) an optical condenser configured to receive and direct the first light beam and the second light beam to a common exit plane to form the combined light beam. Additional aspects of the light engine system include any and all of the following aspect in any combination, including by way of example the combinations as presented: A twenty-second aspect according to the twenty-first aspect wherein the common exit plane comprises an exit aperture. A twenty-third aspect according to the twenty-first or twenty-second aspect wherein the light guide comprises an optical fiber. A twenty-fourth aspect according to any of the twenty-first through twenty-third aspects, further comprising supporting the light guide with a support structure that supports the light guide as said disposed relative to the first optical path in the off-axis direction. A twenty-fifth aspect according to the twenty-fourth aspect wherein the support structure blocks less than 3% of the first light beam. A twenty-sixth aspect according to the twenty-fourth aspect or twenty-fifth aspect wherein the support structure comprises a support member in the form of a blade having a support edge and defining a blade plane and wherein the light guide is supported at or proximate to the support edge and resides within the blade plane. A twenty-seventh aspect according to the twenty-sixth aspect wherein the light guide has a diameter and wherein the blade has a width the same as or less than the diameter of the light guide. A twenty-eighth aspect according to any of the twenty-fourth through twenty-seventh aspects wherein the support structure is adjustable to adjust at least one of a position and an orientation of the end face of the light guide within the first optical path. A twenty-ninth aspect according to any of the twenty-first through twenty-eighth aspects, wherein the light guide comprises a bend. A thirtieth aspect according to any of the twenty-first through twenty-ninth aspects wherein the end face of the light guide resides on the first axis and faces the optical condenser. A thirty-first aspect according to any of the twenty-first through thirtieth aspects wherein the second light beam emitted from the fiber end face has a first beam angle and further comprising an optical component that resides at or proximate the fiber end face and that is configured to change the first beam angle. A thirty-second aspect according to any of the twenty-first through thirty-first aspects wherein the first and second light beams have respective first and second wavelength bands, and wherein the first and second wavelength bands are non-overlapping. A thirty-third aspect according to any of the twenty-first through thirty-second aspects and further comprising: a collector optical system operably arranged relative to the first light source to form the first light beam; and wherein the collector optical system and condenser optical system are axially spaced apart by an axial distance AXD, and wherein the end face of the distal section of the light guide resides between the collector optical system and the condenser optical system and is axially spaced apart from the collector optical system by an axial distance of at least 0.25·AXD.

A forty-first aspect of the disclosure is directed to a light engine system for generating a combined light beam, comprising: a) a first light source configured to form a first light beam that travels along a first axis in a first direction, the first light beam having an expanded portion; b) a second light source comprising a light guide having a bend and a distal section terminated by an end face, with at least the distal section intersecting the expanded section of the first light beam from an off-axis direction relative to the first axis to direct a second light beam emitted from the fiber end face to travel in the first direction and within the expanded portion of the first light beam; and c) a condenser optical system configured to receive and direct the first light beam and the second light beam to a common exit plane to form the combined light beam. Additional aspects of the light engine system include any and all of the following aspect in any combination, including by way of example the combinations as presented: A forty-second aspect according to the forty-first aspect wherein the light guide comprises a flexible light pipe. A forty-third aspect according to the forty-first aspect wherein the light guide comprises an optical fiber. A forty-fourth aspect according to any of the forty-first through forty-third aspects wherein the light engine system includes a light-redirecting element arranged to redirect the first light beam to travel from a second direction to the first direction, and wherein neither the light guide nor the second light beam passes through the light-redirecting element. A forty-fifth aspect according to the forty-fourth aspect wherein the distal section of the light guide intersects the expanded portion of the first light beam upstream of the light-redirecting element. A forty-sixth aspect according to any one of the forty-first through forty-fourth aspects and further comprising: first and second wavelength-selective light-redirecting members operably disposed along the first axis, and wherein the distal section of the light guide resides between the first and second wavelength-selective light-redirecting members. A forty-seventh aspect according to any of the forty-first through forty-sixth aspects wherein the first light source has an etendue $\varepsilon_H$, the second light source has an etendue $\varepsilon_F$, and wherein $\varepsilon_H > 10 \cdot \varepsilon_F$. A forty-eighth aspect according to any of the forty-first through forty-sixth aspects, wherein the first light source has an etendue $\varepsilon_H$, the second light source has an etendue $\varepsilon_F$, and wherein $\varepsilon_H > 100 \cdot \varepsilon_F$. A forty-ninth aspect according to any of the forty-first through forty-sixth aspects wherein the first light source has an etendue $\varepsilon_H$, the second light source has an etendue $\varepsilon_F$, and wherein $\varepsilon_H > 1000 \cdot \varepsilon_F$. A fiftieth aspect according to any of the forty-first through forty-ninth aspects wherein the light guide is operably supported at or proximate to a support edge of a thin and planar support structure. A fifty-first aspect according to any of the forty-first through fiftieth aspects wherein the light guide comprises an optical fiber, the bend comprises a fiber bend, the distal section comprises a distal fiber section and the end face comprises a fiber end face, and further comprising: a support structure that operably supports at least the distal fiber section of the optical fiber at or proximate a support edge so that the fiber end face resides within the first optical path. A fifty-second aspect according to the fifty-first aspect wherein the support structure blocks less than 3% of the first light beam. A fifty-third aspect according to the fifty-first aspect or the fifty-second aspect wherein the support structure comprises a support member in the form of a blade having a fiber support edge and defining a blade plane, and wherein the optical fiber is supported at or proximate to the fiber support edge and resides within the blade plane. A fifty-fourth aspect according to the fifty-third aspect wherein the optical fiber has a diameter and wherein the blade has a width the same as or less than the diameter of the optical fiber. A fifty-fifth aspect according to any of the fifty-first through fifty-fourth aspects wherein the support structure is configured to maintain the fiber bend in the optical fiber. A fifty-sixth aspect according to any of the fifty-first through fifty-fifth aspects wherein the support structure is adjustable to adjust at least one of a position and an orientation of the fiber end face within the first light beam. A fifty-seventh aspect according to any of the fifty-first through fifty-sixth aspects wherein the fiber end face resides on the first axis and faces the condenser optical system. A fifty-eight aspect according to any one of the forty-first through fifty-seventh aspects wherein the second light beam emitted from the fiber end face has a first beam angle and further comprising an optical component operably disposed at or proximate to the fiber end face and configured to change the first beam angle. A fifty-ninth aspect according to any one of the forty-first through fifty-eighth aspects wherein the first and second light beams have respective first and second wavelength bands, and wherein the first and second wavelength bands are non-overlapping.

A seventy-first aspect of the disclosure is directed to a light engine system, comprising: a first light source; an optical system having a first axis and that defines a first optical path from the first light source to an exit plane over which a first light beam emitted from the first light source travels when the first light source is activated, the optical system defining an expanded portion of the first optical path over which an expanded portion of the first light beam travels; a fiber light source assembly comprising: i) a fiber light source having a fiber with a distal section terminated by a fiber end face; and ii) a support structure that operably supports at least the distal section of the fiber within the first optical path to define a second optical path from the fiber output end to the exit plane over which a second light beam from the fiber light source travels when the fiber light source is activated, wherein the second optical path resides within the first optical path; and wherein the support structure supports the fiber so that the end section of the fiber intersects the expanded portion of the first optical path in an off-axis direction relative to the first axis. Additional aspects of the light engine system include any and all of the following aspects in any combination, including by way of example the combinations as presented: A seventy-second aspect according to the seventy-first aspect wherein the fiber end face of the optical fiber resides on the first axis. A seventy-third aspect according to the seventy-first aspect or the seventy-second aspect wherein fiber end face of the optical fiber resides in a plane perpendicular to the first axis. A seventy-fourth aspect according to any of the seventy-first through seventy-third aspects wherein the support structure is movable to adjust a position and orientation of the fiber end face of the fiber within the expanded portion of the first optical path. A seventy-fifth aspect according to any of the seventy-first through seventy-fourth aspects wherein the first light source has an etendue $\varepsilon_H$, the fiber light source has an etendue $\varepsilon_F$, and wherein $\varepsilon_H > 10 \cdot \varepsilon_F$. A seventy-sixth aspect according to any of the seventy-first through seventy-fourth aspects wherein the first light source has an etendue $\varepsilon_H$, the fiber light source has an etendue $\varepsilon_F$, and wherein $\varepsilon_H > 100 \cdot \varepsilon_F$. A seventy-seventh aspect according to any one of the seventy-first through seventy-fourth aspects wherein the first light source has an etendue $\varepsilon_H$, the fiber light source has an etendue $\varepsilon_F$, and wherein $\varepsilon_H > 1000 \cdot \varepsilon_F$. A seventy-eighth aspect according to any of the seventy-first through seventy-seventh aspects further comprising an optical component disposed at or proximate to the fiber end face. A seventy-ninth aspect according to any of the seventy-first through seventy-eighth aspects wherein the first and second light beams respectively have first and second wavelength bands, and wherein the first and second wavelength bands are non-overlapping. An eightieth aspect according to any of the seventy-first through seventy-ninth aspects wherein the fiber support structure comprises a thin planar support member that defines a support member plane and that maintains a bend in the fiber in the distal fiber section, wherein the bend resides in the support member plane.

A ninety-first aspect of the disclosure is directed to a fiber light source assembly, comprising: a fiber light source having an optical fiber with a proximal fiber section and a distal fiber section, with the distal fiber section being terminated by a fiber end face; a support member having a thin and planar shape and defining a support member plane, the support member comprising proximal and distal ends and a fiber support edge; and at least one securing feature at or proximate to the fiber support edge to secure the optical fiber at or proximate to the fiber support edge while forming a bend in the optical fiber in the support member plane, with the proximal fiber section residing at or proximate to the proximal end of the support member and the distal fiber section residing at or proximate to the distal end of the support member. Additional aspects of the fiber light source assembly include any and all of the following aspects in any combination, including by way of example the combinations as presented: A ninety-second aspect of the disclosure according to the ninety-first aspect wherein the optical fiber has an optical fiber diameter and wherein the fiber support edge has a width the same as or less than the optical fiber diameter. A ninety-third aspect according to the ninety-first aspect or the ninety-second aspect, wherein the at least one securing feature comprises first and second securing features respectively residing at or near the proximal and distal ends of the support member. A ninety-fourth aspect according to any one of the ninety-first through ninety-third aspects wherein at least a portion of the fiber support edge has a curve. A ninety-fifth aspect according to any of the ninety-first through ninety-fourth aspects wherein the fiber support member includes a mounting feature. A ninety-sixth aspect according to the ninety-fifth aspect and further comprising a mount attached to the support member at the mounting feature. A ninety-seventh aspect according to any of the ninety-first through ninety-sixth aspects wherein the at least one securing feature comprises a securing material. A ninety-eighth aspect according to any of the ninety-first through ninety-seventh aspects and further comprising an optical component operably arranged or formed on the fiber end face or operably arrange proximate to the fiber end face.

A hundred-first aspect is directed to a method of forming a combined light beam, comprising directing a first light beam from a first light source having an emission surface to an exit plane over a first optical path of an optical system that includes a first axis, wherein the first optical path comprises an expanded portion over which an expanded portion of the first light beam travels; emitting from an end face of a distal section of a light guide a second light beam that travels within the expanded portion of the first light beam and over a second optical path within the expanded portion of the first optical path by inserting the distal section of the light guide into the expanded portion of the first optical path from an off-axis direction; directing the second light beam to the exit plane of the first light beam to form the combined light beam. Additional aspects of the method include any and all of the following aspects in any combination, including by way of example the combinations as presented: A one-hundred second aspect according to the one-hundred-first aspect wherein the first light beam is redirected by a light-redirecting member, and wherein the inserting of the distal section of the light guide comprises performing said inserting downstream of the light-redirecting member. A one-hundred-third aspect according to the one-hundred-first or one-hundred-second aspect wherein the inserting of the distal section of the light guide is performed between adjacent wavelength-selective light-redirecting members disposed along the first axis. A one-hundred-fourth aspect according to any of the one-hundred-first through one-hundred-third aspects wherein the inserting the distal section of the light guide comprises positioning the end face of the light guide on the first axis. A one-hundred-fifth aspect according to any of the one-hundred-first through one-hundred-fourth aspects wherein the inserting of the distal section of the light guide comprises positioning the end face of the light guide in a plane perpendicular to the first axis. A one-hundred-sixth aspect according to any of the one-hundred-first through one-hundred-fourth aspects wherein the inserting of the distal section of the light guide comprises positioning the end face of the light guide at an angle relative to the first axis. A one-hundred-seventh aspect according to any of the one-hundred-first through one-hundred-sixth aspects and further comprising disposing an optical element at or adjacent the end face of the light guide to change the second optical path of the second light beam. A one-hundred-eighth aspect according to any of the one-hundred-first through one-hundred-seventh aspects wherein the inserting of the distal section of the light guide comprises supporting at least the distal section of the light guide with a support member. A one-hundred-ninth aspect according to the one-hundred-eight aspect wherein the support member blocks less than 3% of the first light beam. A one-hundred-tenth aspect according to the one-hundred-eight or one-hundred-ninth aspect and further comprising the support member maintaining a bend in the light guide. A one-hundred-eleventh aspect according to any one of the one-hundred-first through one-hundred-tenth aspects wherein the first light beam and the second light beam have non-overlapping wavelength bands. A one-hundred-twelfth aspect according to any one of the one-hundred-first through one-hundred-eleventh aspects wherein in said operably disposing of the distal section of the light guide comprises providing an optical component at or proximate to the fiber end face. A one-hundred-thirteenth aspect according to any of the one-hundred-first through one-hundred-twelfth aspects wherein the light guide comprises an optical fiber. A one-hundred-fourteenth aspect according to any one of the one-hundred-first through one-hundred-thirteenth aspects further comprising: receiving the combined light beam with a light homogenizer to form homogenized light; and passing the homogenized light to an optical light guide cable having in output end. A one-hundred-fifteenth aspect according to the any of the one-hundred-first through one-hundred-fourteenth aspects wherein said directing of the first and second light beams is performed using a condenser optical system, and further comprising placing the end face of the light guide at a distance relative to the condenser optical system to obtain a light distribution from the output end of the optical light guide cable that meets or exceeds a select light distribution tolerance. A one-hundred-sixteenth aspect according to the any one of the one-hundred-first through one-hundred-fifteenth aspects wherein forming the expanded portion of the first light beam comprises receiving divergent first light from the first light source with a collector optical system, wherein the collector optical system and the condenser optical system are spaced apart by a distance AXD, and wherein the fiber end face is axially spaced apart from the collector optical system in the direction of the condenser optical system. A one-hundred-seventeenth aspect according to any one of the one-hundred-first through one-hundred fifteenth aspects wherein forming the expanded portion of the first light beam comprises receiving divergent first light from the first light source with a collector optical system, wherein the collector optical system and the condenser optical system are spaced apart by a distance AXD, and wherein the fiber end face is axially spaced apart from the collector optical system in the direction of the condenser optical system by an axial distance of at least 0.25·AD.

It will be appreciated that any of the variations, aspects, features and options described in view of the systems apply equally to the methods and vice versa. It will also be clear that any one or more of the above variations, aspects, features and options can be combined.

BRIEF DESCRIPTION OF THE FIGURES

The accompanying drawings are included to provide a further understanding, and are incorporated in and constitute a part of this specification. The drawings illustrate one or more example(s), and together with the Detailed Description explain principles and operation of the various example systems and methods. As such, the disclosure will become more fully understood from the following Detailed Description, taken in conjunction with the accompanying Figures, in which:

FIG. 7A and FIG. 7B are close-up schematic diagrams of prior art HE optical system configurations wherein a light-redirecting member has an aperture used to introduce into the HE optical path along the main system axis either the fiber (FIG. 7A) or the LE light beam (FIG. 7B) from a fiber light source residing behind the light-redirecting member;

FIG. 8A and FIG. 8B are close-up schematic diagrams that further illustrate two examples of how the LE light source assembly disclosed herein is used to place the fiber of the fiber light source within the HE system optical path $OP_H$ from an off-axis location without passing the fiber or LE light beam through an aperture of a light-redirecting member;

Figure 1A:
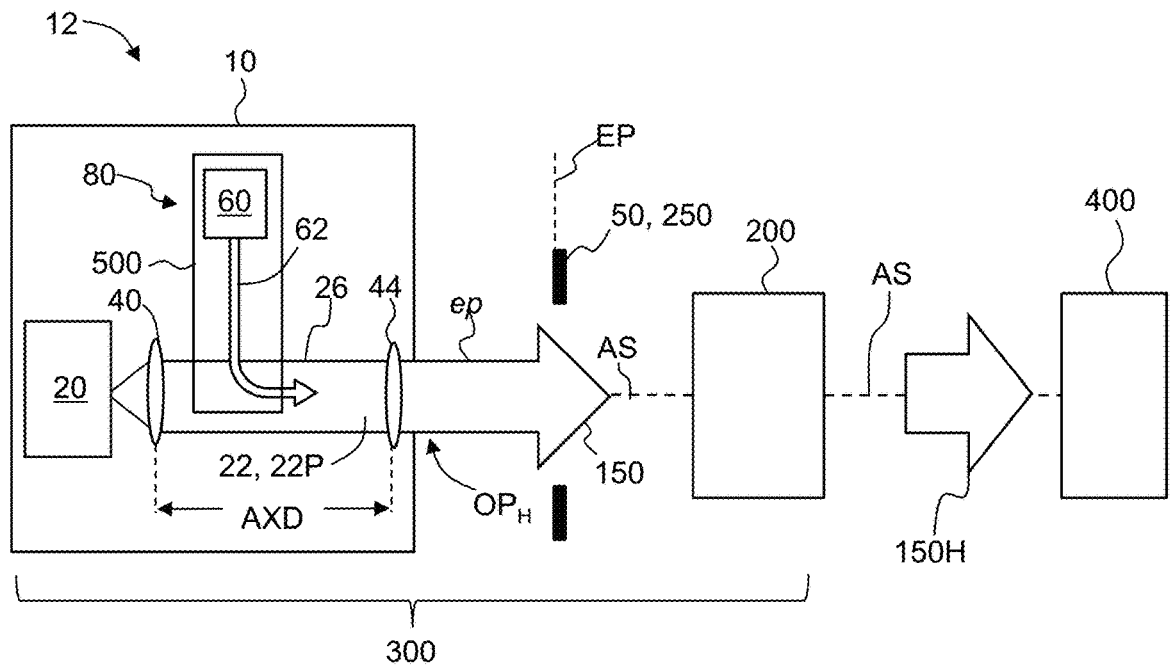
FIG. 1A is a schematic diagram of a generalized example multi-spectral imaging system that employs the light engine systems with at least one high-etendue (HE) light source and at least one low-etendue (LE) light source as disclosed herein.

Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

DETAILED DESCRIPTION

Reference is now be made in detail to implementations and examples of various aspects and variations of the disclosure, which are illustrated in the accompanying drawings. Various systems, methods, devices, optical components, light sources, optical elements, etc. are described herein by way of illustration and non-limiting examples. The various examples are be described more fully below with reference to the accompanying drawings; however, they may be embodied in different forms and should not be construed as limited to the examples set forth herein. Rather, the examples are provided so that this disclosure will be thorough and complete, and will fully convey exemplary implementations to those skilled in the art. Although several exemplary variations of the systems and methods are described herein, other variations of the systems and methods may include aspects of the systems and methods described herein combined in any suitable manner having combinations of all or some of the aspects described.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Relative terms like "front," "back," "top,", "bottom," "upper," "lower," "behind," etc., are used for convenience and to facilitate explanation and are not intended to be limiting as to direction, position, orientation, etc.

The claims as set forth below are incorporated into and constitute part of this Detailed Description.

Cartesian coordinates are shown in some of the Figures for the sake of reference and are not intended to be limiting as to direction, position or orientation.

The abbreviation "nm" stands for "nanometer."

The abbreviation "mm" stands for "millimeter."

The abbreviation "μm" stands for "micron" or "micrometer."

The term "wavelength" is denoted by λ and in some cases refers to a center wavelength of a relatively narrow wavelength bandwidth δλ or a relatively large wavelength bandwidth Δλ.

The term "optical fiber" is referred to as "fiber" in the discussion below where convenient.

The terms "light" and "light beam" can be used interchangeably herein and depending on the context of the discussion can also be used to distinguish between light that travels within and/or is otherwise confined within a light guide and light that is emitted from an end face of the light guide.

The terms "multi-spectral light" and "combined light beam" means light or a light beam having different wavelengths and that has a bandwidth Δλ substantially greater than that of monochromatic light, e.g., at least 10 nm, e.g., 100 nm or many hundreds of nanometers.

The term "wavelength band" B is defined by a center wavelength λ and a bandwidth Δλ around the center wavelength and having lower and upper wavelengths.

The term "vertex" in the context of a lens means the point at which the axis of symmetry intersects the surface of the lens.

Numerical aperture (NA) is the measure of the angular range of acceptance of light or the angular distribution of the emission of light of an optical system or light source.

Etendue is denoted ε and is a measure of the distribution of light from a light source in terms of its emission area and emission solid angle.

In the discussion below, a light source with a relatively high etendue is referred to as a high-etendue ("HE") light source, and the light beam from the HE light source is referred to for ease of discussion as a HE light beam to indicate that the light beam originated from the HE light source.

The terms "upstream" and "downstream" refer to locations relative to the direction of light travel, wherein "A is upstream of B" means that the light is incident first upon A and then B, and wherein "A is downstream of B" means that the light is first incident upon B and then A.

The term "lens" as used herein can mean a collection of optical components or a single optical component. Likewise, an optical component can be refractive, reflective, diffractive, etc. unless specifically stated otherwise.

The mathematic expression "a, b, c . . . n>z" is shorthand notation for "a>z, b>z, . . . n>z."

The "optical path" of an optical system refers to a route taken by light through the optical system from one location to another and is considered an intrinsic property of the optical system as defined by its constituent elements, i.e., it exists even when there is no light traveling through the optical system. In the discussion below, the LE light beam travels over an LE optical path $OP_L$, which is also referred to as a fiber optical path when referring to an optical fiber embodiment. Also in the discussion below, the HE optical path $OP_H$ associated with the HE light source has an expanded portion over which the expanded HE light beam 22P travels.

Figure 2A:
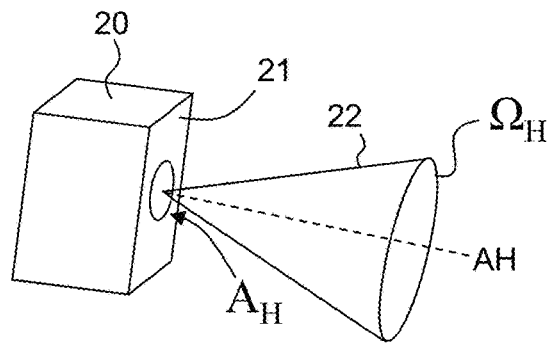
FIG. 2A and FIG. 2B are elevated and side views, respectively, of an example HE light source showing the emitted HE light beam and the relevant HE light beam parameters.
Figure 5A:
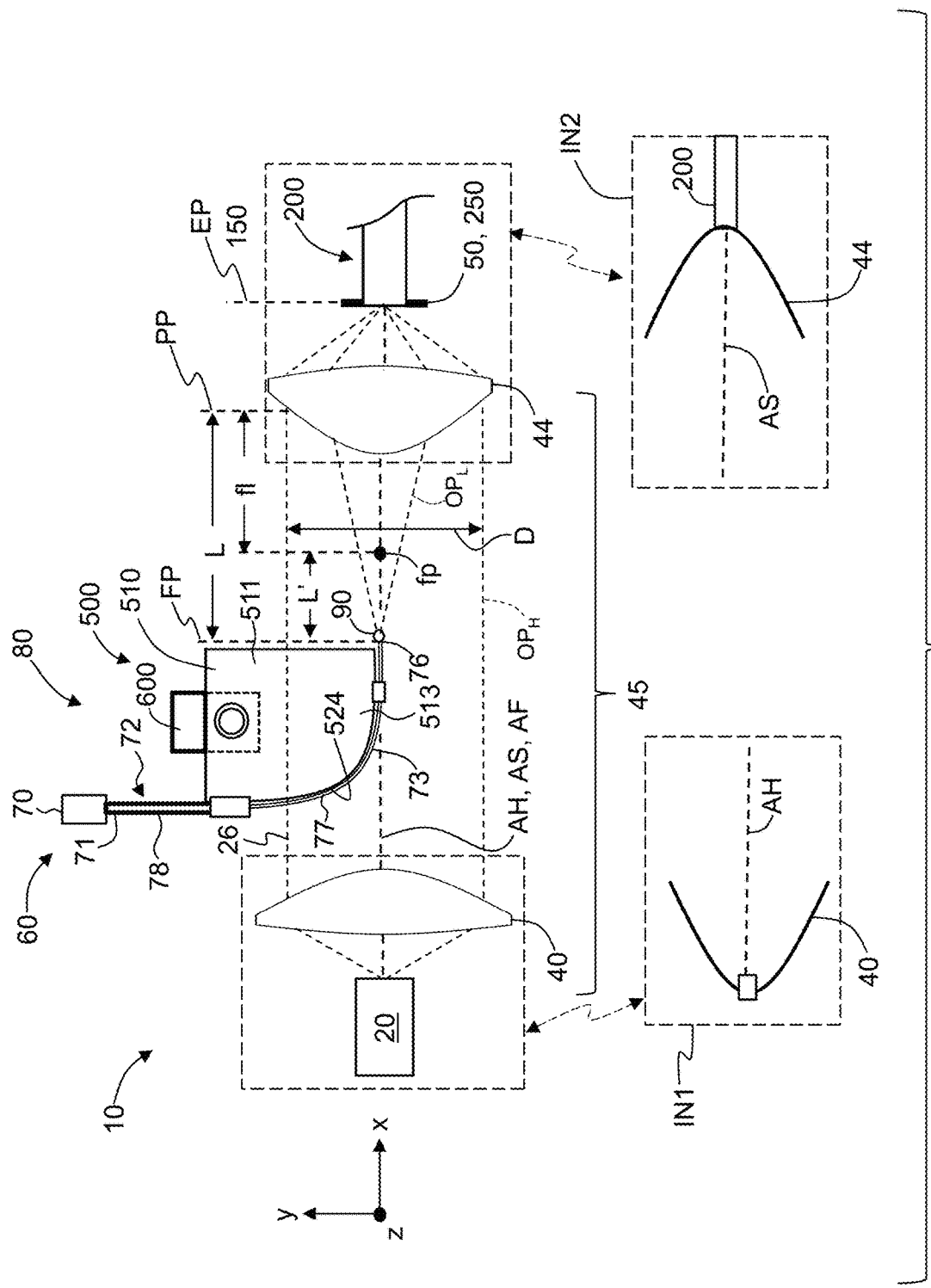
FIG. 5A and FIG. 5B are schematic diagrams of a first example light engine that employs a single LE light source assembly to place the fiber of the fiber light source at a select location in the HE optical path from an off-axis location.

For the purposes of the present disclosure, and with reference to FIG. 2A and FIG. 5A for example, a location that is considered "near" the HE light source 20 is one that resides between the emitting surface 21 of the HE light source and the collector optical system 40 and so resides within a diverging HE light beam 22 when the HE light source 20 is activated. In the description below, the LE light source assembly 80 resides in an expanded portion ep of the optical path $OP_H$ associated with the expanded portion 22P of the HE light beam 22P optically downstream of the collector optical system and is thus not "near" the HE light source 20 as the term "near" is used herein. In the discussion below, reference to the HE optical path $OP_H$ means the expanded portion ep of the HE optical path unless otherwise noted.

Multi-Spectral Imaging System

Combining very different types of light sources for a multi-spectral light engine, such as, for example, LED light sources, optical fiber-based light sources ("fiber light sources"), laser diodes, etc. having very different light emission characteristics, including emission wavelength and, in particular, etendue, presents challenges with respect to selective placement of the light sources to efficiently homogenize and deliver the multi-spectral light to a multi-spectral device while also addressing commercial practicalities for the light engine, such as cost and compactness. The light engine systems and methods disclosed herein have been developed with appreciation of these challenges.

FIG. 1A is a schematic diagram of a generalized example multi-spectral imaging system 12 that employs the light engine systems and high and low etendue light source assemblies as disclosed herein according to some examples. The multi-spectral system 12 has an axis AS and includes a multi-spectral light engine system ("light engine") 10 as disclosed herein and as described in greater detail below, and a multi-spectral imaging device 400. The multi-spectral system 12 may further include a light homogenizing apparatus ("light homogenizer") 200, as shown in FIG. 1A, with the combination of the light engine 10 and the light homogenizer 200 constituting a multi-spectral illuminator 300. In some examples, not shown, the multi-spectral system 12 may exclude a light homogenizer or replace light homogenizer 200 with a non-homogenizing light guide.

The light engine 10 includes one or more relatively high-etendue ("HE") light sources 20. Each HE light source 20 generates a light beam 22, which starts out as a diverging light beam and that is collected and expanded (e.g., substantially collimated) by a collector optical system 40 to form an expanded portion 22P of the HE light beam 22. The light engine 10 also includes one or more low etendue ("LE") light sources 60 having a relatively low etendue compared with the etendue of the HE light source 20. For example, the HE light source may have an etendue greater than 10 times that of the LE light source. Each LE light source generates a light beam 62. The light beam 22 generated by the HE light source 20 is referred to as an "HE light beam" while the light beam 62 generated by the LE light source 60 is referred to as a "LE light beam." In the discussion below, multiple HE light beams 22 are denoted 22A, 22B, . . . while multiple LE light beams are denoted 62A, 62B, . . . . Each LE light source is part of a LE light source assembly 80 that in an example may include an LE support structure 500. A condenser optical system 44 resides optically downstream of the collector optical system 20 and is axially spaced apart therefrom by a distance AXD, which in an example is measured from the closest surfaces (on-axis vertices) of collector optical system 20 and condenser optical system 44.

The light engine 10 is configured to combine one or more HE light beams 22 with the one or more LE light beams 62 to generate a combined light beam 150, which can also be referred to as a multi-spectral light beam. As described below, LE light source assembly 80 is configured to introduce the LE light beam from an off-axis direction into the optical path over which the HE light beam 22 travels.

The combined light beam 150 is directed by the condenser optical system 44 to converge to a common location at an exit plane EP, which can optionally include an exit aperture 50 through which the combined light beam passes. The multi-spectral light 150 is received by the light homogenizer 200, which has an entrance aperture 250 that resides in the exit plane EP and in an example is substantially the same size as the exit aperture 50 of the light engine 10. In an example, the entrance aperture 250 serves as the exit aperture 50, which can act as an etendue gate.

The combined light beam 150 is received and processed by the light homogenizer 200 to form homogenized multi-spectral light 150H. FIG. 1C is a generalized plot of (relative) intensity I(θ) as a function of emission angle θ from the light homogenizer 200, showing the HE light 22 and the LE light 62 and illustrating the smoothed out intensity distribution with angle of these two light components after having passed through the light homogenizer.

The uniformized multi-spectral light 150H is then received by the multi-spectral imaging device 400 and is used thereby in carrying out its intended function of the multi-spectral imaging system 12. Example multi-spectral imaging devices 400 include endoscopes (both rigid and flexible), open-field imaging devices, and the like.

Figure 1B:
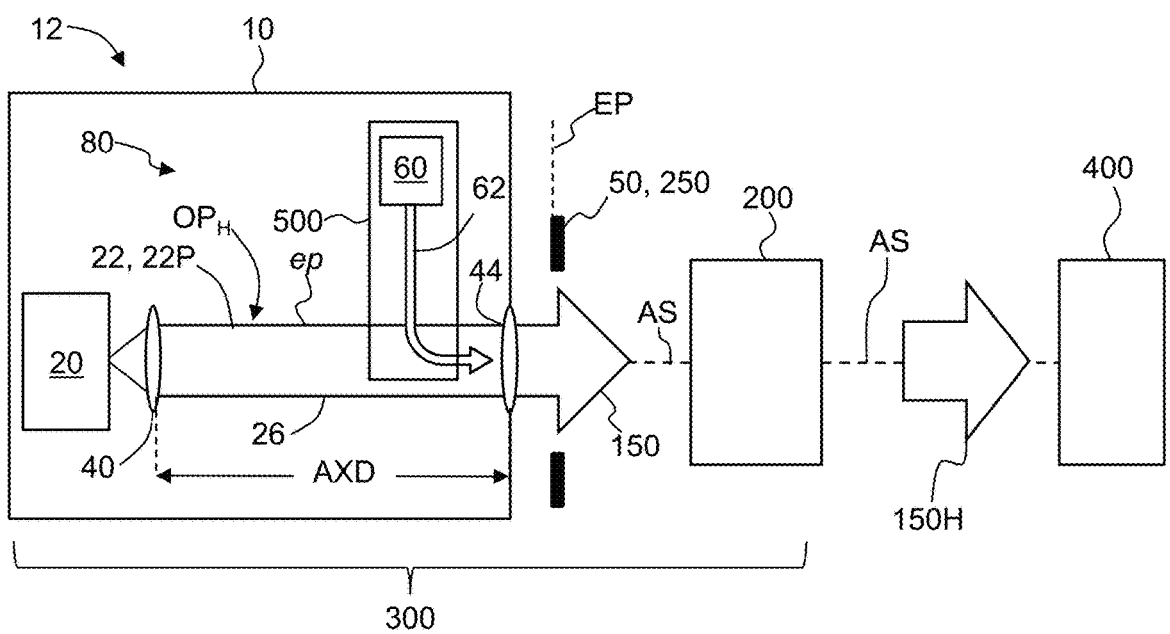
FIG. 1B is a schematic diagram similar to FIG. 1A and shows how the LE light source assembly can be axially moved and positioned within the expanded portion of the HE light beam.
Figure 1C:
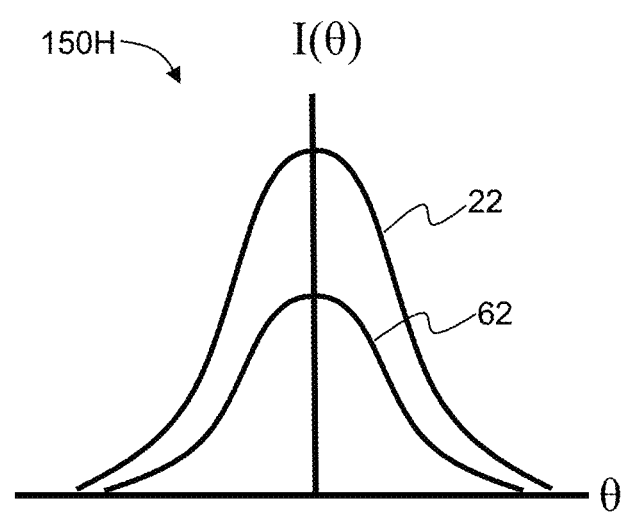
FIG. 1C is a generalized plot of (relative) intensity $I(\theta)$ as a function of emission angle $\theta$ from the light homogenizer of FIG. 1A, separately showing the homogenized HE light and the homogenized fiber light.

FIG. 1B is similar to FIG. 1A and illustrates how the LE light source assembly 80 can be axially moved within the expanded portion 22P of the HE light beam 22 (and thus the expanded portion ep of the HE optical patch $OP_H$) for optimal or near-optimal placement.

The generalized examples as shown in both FIG. 1A and FIG. 1B allow for conducting light from a LE light source 60 and introducing it as a LE light beam 62 that travels within the expanded portion ep of the optical path $OP_H$ of a relatively high etendue light beam 22 from an HE light source 20, without passing the LE light beam through an aperture in a HE light redirecting element to enable the introduction. In other words, in one example, LE light beam 62 is introduced through a periphery 26 (i.e., the "side" or "edge") of the expanded portion 22P of the HE light beam 22 and travels over its own optical path $OP_L$ that resides entirely within the expanded portion ep of the HE optical path $OP_H$ (and thus entirely within the HE light beam 22). The LE light beam 62 need not pass through a light-redirecting element in order to enter into and then travel within the expanded portion 22P of the HE light beam 22 and in particular need not pass through an aperture in a light-directing element to enter into and then travel within the expanded portion 22P of the HE light beam. Likewise, in examples as discussed below, no portion of the LE light source assembly 80 need reside within the collector optical system 20 or upstream of the collector optical system, and in the examples discussed below the light guide end face 72 resides optically downstream of the collector optical system and axially spaced apart therefrom and so need not reside within (including embedded within an element of) the collector optical system 20.

Example HE Light Source

Figure 2B:
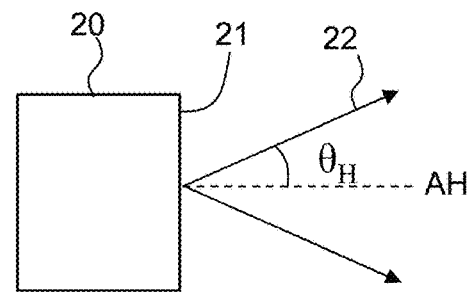

An example HE light source includes one or more LEDs. In some examples, the HE light source may include a white light source, such as a white LED or lamp, or a combination of visible light LEDs that may be combined to form white light. The etendue of the HE light source is defined by its emission area and the solid angle (or numerical aperture) of the emitted light. FIG. 2A and FIG. 2B are elevated and side views, respectively, of an example HE light source 20. The HE light source 20 has an emitting surface 21 of area $A_H$ from which the HE light beam 22 is emitted over a solid angle $\Omega_H$ (in three dimensions, as shown in FIG. 2A) or an emission angle $\theta_H$ (in two dimensions, as shown in FIG. 2B). The HE light beam 22 travels axially along a HE light source axis ("HE axis").

The etendue of a light source is defined in the art as:

$$\text{Etendue} = \int_{Area} \text{source,port,aperture,etc} \int_{Solid\ angle} \text{subtense at each location } d\Omega dA$$

Example LE Light Source

An example LE light source 60 is comprises an optical fiber, e.g., is a fiber-based LE light source, which in an example has an etendue defined by the fiber core area and numerical aperture of an optical fiber. In the discussion below, the example fiber-based LE light source 60 is referred to as fiber light source 60, with the understanding that this particular type of LE light source is referenced in the discussion below by way of non-limiting example for ease of discussion and illustration.

Figure 3A:
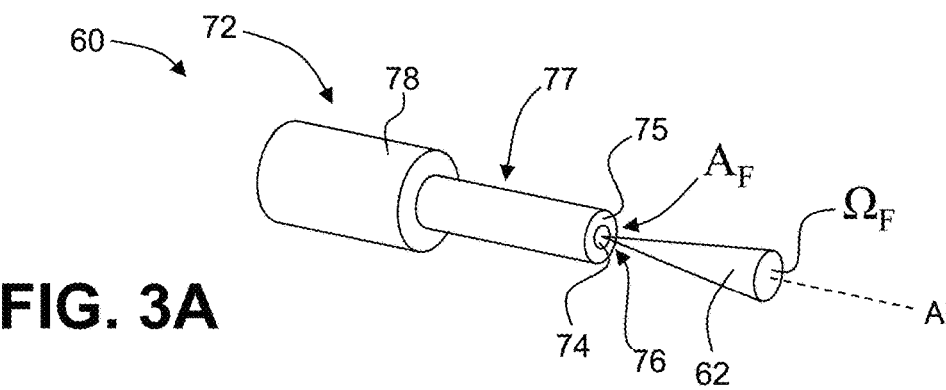
FIG. 3A and FIG. 3B are elevated and side views, respectively, of an example fiber used in a fiber light source and showing the emitted LE light beam and the relevant LE light beam parameters.
Figure 3B:
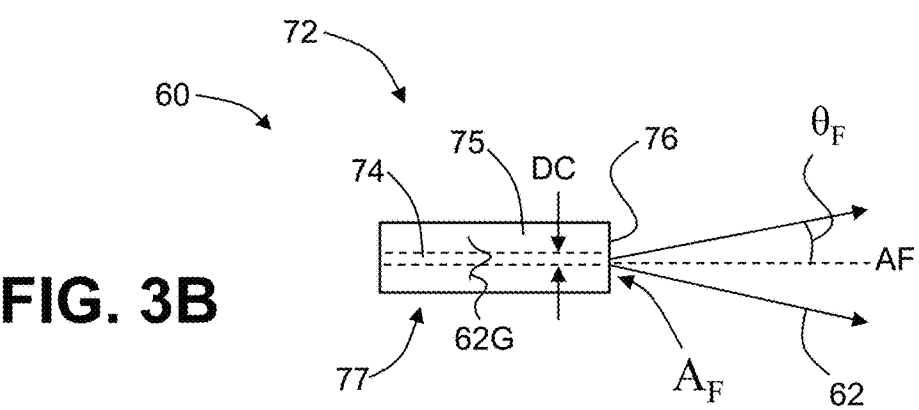

FIG. 3A is an elevated view and FIG. 3B is a side view of an example light-guiding element or "light guide" in the form of an optical fiber ("fiber") 72 used in an example fiber light source 60. The fiber 72 has a core 74, a cladding 75 that surrounds the core, and an end face 76. The core 74 and cladding 75 are made of glass and constitute a glass portion 77 of the fiber 72. The fiber 72 can also include a non-glass protective coating 78 that can be stripped away to expose the glass portion 77, which is also referred to as the "bare fiber" or "bare glass section" when so exposed. Alternative light guides or light conduits may be used in place of an optical fiber as used herein for conducting light from or for a LE light source such as fiber light source 60, such as rigid or flexible light pipes, prisms, lens relays, prismatic pipes, light rods, or mirrored light pipes. The optical fiber example of the light guide is used for ease of illustration and discussion, and because it may be preferable to use an optical fiber in certain applications such as medical applications and because fiber-based light sources are commercially available and have advantageous mechanical and optical properties.

Guided light 62G (see FIG. 3B) traveling mainly in the fiber core 74 is "emitted" from the fiber core at the end face 76 to form the LE light beam 62, which travels axially along a fiber axis AF. The fiber core 74 has a diameter DC (see FIG. 3B). In the context of a fiber light source 60, the term "emitted" means that the light exits the end face 76 at the fiber 72 after having traveled in the fiber 72 as the guided light 62G.

In various examples, the (relatively) high-etendue HE light source 20 of etendue $\varepsilon_H$ and the (relatively) low-etendue fiber light source 60 of etendue $\varepsilon_L$ satisfies at least one of the following relationships between their respective etendues: $\varepsilon_H > 10 \cdot \varepsilon_L$, or $\varepsilon_H > 100 \cdot \varepsilon_L$, or $\varepsilon_H > 1000 \cdot \varepsilon_L$, or $\varepsilon_H > 2000 \cdot \varepsilon_L$, or $\varepsilon_H > 10,000 \cdot \varepsilon_L$, depending on the exact types of high-etendue light source and fiber light source considered. In light engine applications for which the allowable light loss associated with inserting a LE light source into the light engine is highly constrained, for example when high system efficiency is required, the ratio between the HE light source etendue and the LE light source etendue may be especially constrained.

Figure 4A:
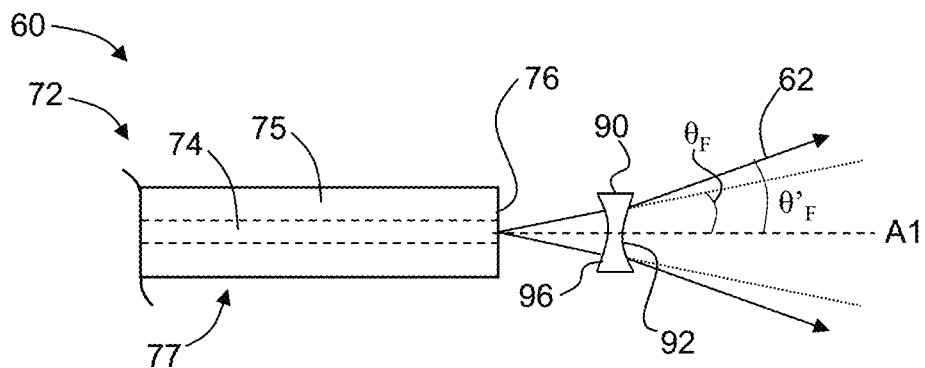
FIGS. 4A through 4E are similar to FIG. 3B and illustrate examples where an optical component is used to change the LE light beam angle to make the LE light beam compatible with the condenser optical system optical properties.

FIGS. 4A through 4E are similar to FIG. 3B and illustrate examples where an optical component 90 is used to change the LE light beam angle, e.g., from an initial LE light beam angle $\theta_F$ to a new LE light beam angle $\theta'_F$, which changes the initial fiber $NA_F$ of the LE light beam 62 to a new or modified LE light beam $NA'_F$. The optical component 90 also therefore changes the optical path over which the LE light beam 62 travels. In the example of FIG. 4A, the optical component 90 is axially spaced apart from the fiber end face 76 and is refractive with negative optical power. This particular optical component 90 is used to increase the beam angle so that $\theta'_H > \theta_H$, which increases the beam numerical aperture from its initial value $NA_F$ to a new value $NA'_F$. In the example of FIG. 4A, the optical component 90 is a biconcave lens element with concave front and back surfaces 92 and 96. Other types of optical components 90 with negative optical power can also be used. Thus, the optical component can be either be operably arranged on or formed on the fiber end face 76 or operably arranged proximate to the fiber end face.

Figure 4B:
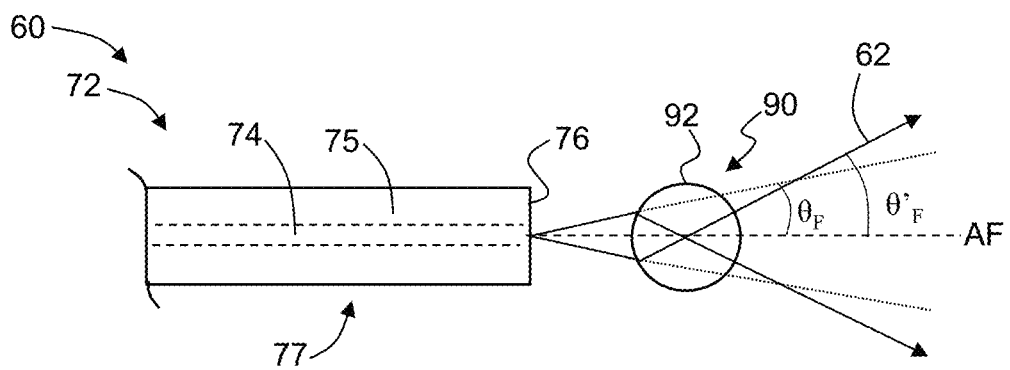

FIG. 4B is similar to FIG. 4A and illustrates another type of refractive optical component 90 axially spaced apart from the fiber end face 76. The example optical component 90 in FIG. 4B has positive optical power and in the example shown increases the beam angle to $\theta'_F$, so that $\theta'_F > \theta_F$ and $NA'_F > NA_F$. In an example, the optical component 90 is a ball lens with a spherical outer surface 92.

Figure 4C:
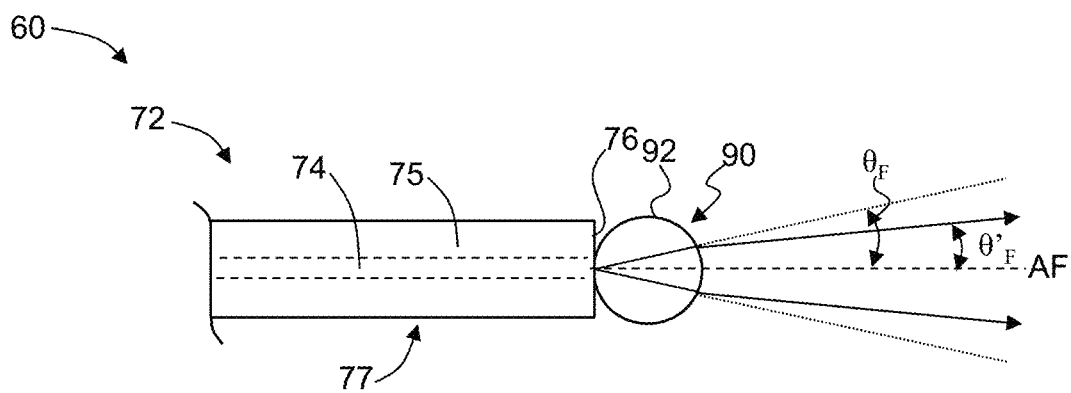

In an example, the optical component 90 can be placed in contact with the fiber end face 76. FIG. 4C is similar to FIG. 4B and shows an example where a ball lens optical component 90 is in contact with the fiber end face 96 and also illustrates an example where the ball lens decreases the beam angle so that $\theta'_F < \theta_F$ and $NA'_F < NA_F$.

Figure 4D:
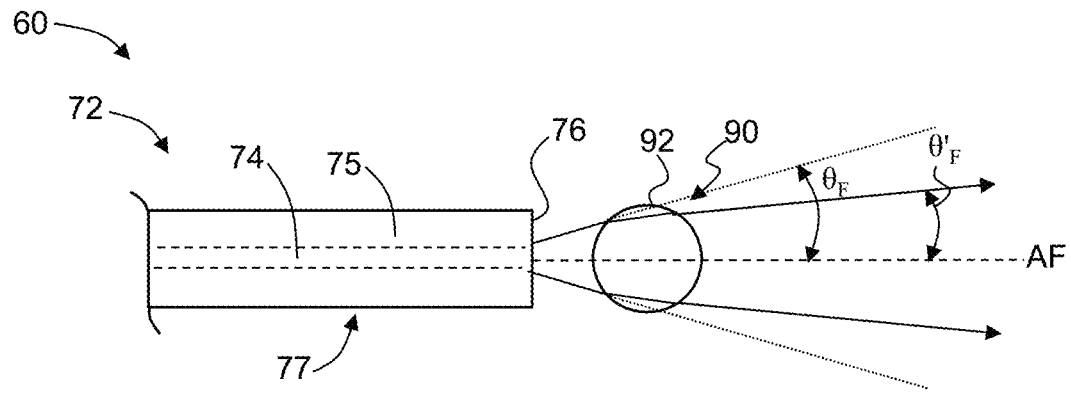

FIG. 4D is similar to FIG. 4C and shows the ball lens optical component 90 spaced apart from the fiber end face 76.

Figure 4E:
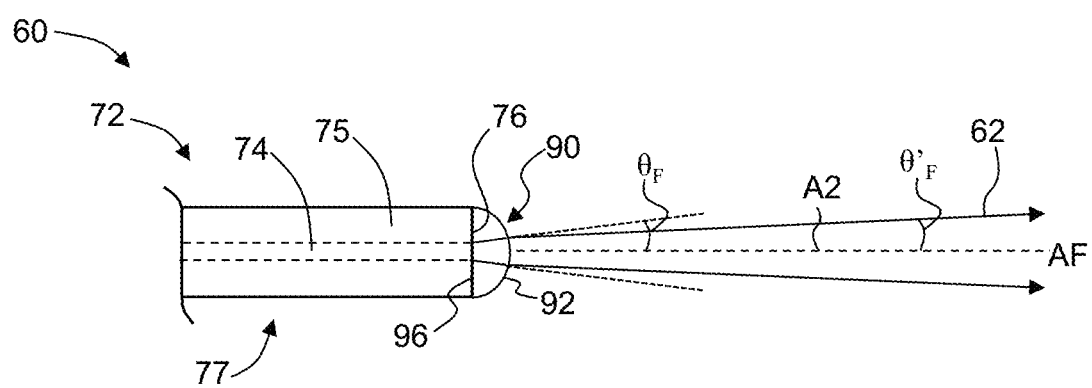

FIG. 4E is similar to FIG. 4C and shows an example optical component 90 in the form of a plano-convex lens element with a convex front surface 92 and a planar back surface 96, with the planar back surface interfaced with the fiber end face 76. The example of FIG. 4D shows the optical component 90 reducing the beam angle and numerical aperture so that $\theta_F > \theta'_F$ and $NA_F > NA'_F$.

Variations of the above-described examples in FIGS. 4A through 4D can be effectively employed in the light engine 10 described below as will be understood by one skilled in the art. In an example, the optical component 90 can comprise one or more elements, which can be one or more of refractive, reflective and diffractive. In another example, the fiber end face 76 can be made curved to define an integrally formed optical component on the fiber 72. A curved fiber end face 76 can be formed using methods known in the art, such as by laser processing.

Example Light Engines

Example light engines 10 are now described in detail. In the discussion and in the relevant Figures, certain basic components such as lens mounts, fixtures, spacers, support electronics, etc. that are known in the art are omitted for ease of discussion and illustration.

a) First Example Light Engine

Figure 5B:
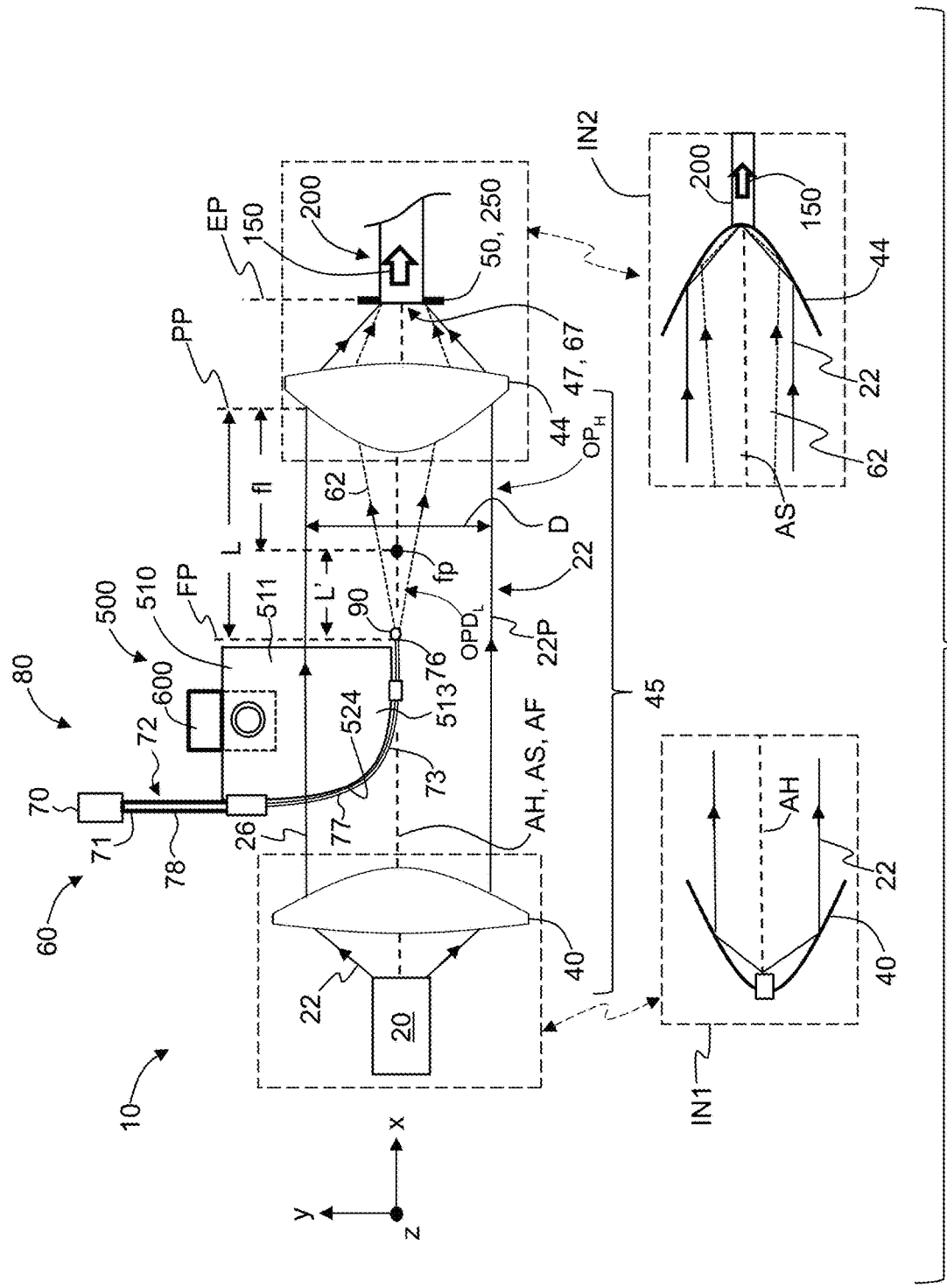

FIG. 5A and FIG. 5B are schematic diagrams of a first example light engine 10 as disclosed herein. The axis AS runs in the x-direction. The example light engine 10 comprises a single HE light source 20 shown residing along the axis AS so that the HE axis AH coincides with the axis AS. In this configuration, the HE light source 20 initially emits the HE light beam 22 directly along the axis AS as an axial beam, as shown in FIG. 5B. The HE light beam 22 has a HE wavelength band $B_H$.

The light engine 10 includes a collector optical system 40 and a condenser optical system (or optical condenser for short) 44 each arranged along the axis AS. The collector optical system 40 and condenser optical system 44 constitute an HE optical system 45, which defines a HE optical path $OP_H$ (FIG. 5A) over which the HE light beam 22 travels when the HE light source 20 is activated (FIG. 5B). The HE optical path $OP_H$ has an expanded portion that resides between the collector optical system 40 and the condenser optical system 44. The expanded portion of the HE optical path $OP_H$ has a transverse dimension D. In the discussions below, reference to the HE optical path $OP_H$ refers to the expanded portion unless otherwise noted.

FIG. 5B shows the HE light beam 22 traveling over the HE optical path $OP_H$ by the collector optical system 40 receiving (collecting) the initial HE light beam 22 and directing it to the condenser optical system 44, which then directs the HE light beam to the exit plane EP and through the optional exit aperture 50.

The condenser optical system 44 may be refractive and have a primary principal plane PP, which is known in the art of optics as a hypothetical plane where the refraction can be considered to occur and which can serve as a positional reference for the condenser optical system. The condenser optical system 44 may also have a (front) focal point fp and a (front) focal length fl, which is the axial distance between the focal point fp and the primary principal plane PP. Other planes or points may alternatively be used as a positional reference for the condenser optical system 44, such as the most upstream vertex of a most upstream lens surface of the optical system.

The close-up insets IN1 of FIG. 5A and FIG. 5B show an alternate embodiment where the collector optical system 40 includes or constitutes a reflective component such as a parabolic or elliptical mirror. In a similar example, the close-up insets IN2 of FIG. 5A and FIG. 5B shows an example of the condenser optical system 44 as being reflective, i.e., comprising a reflective component such as a parabolic mirror, an elliptical mirror, or a compound parabolic collector. In alternative embodiments having a reflective condenser optical system 44, the condenser optical system may not have a primary principal plane, and instead the exit plane of the reflective element may be used as a positional reference.

Figure 5C:
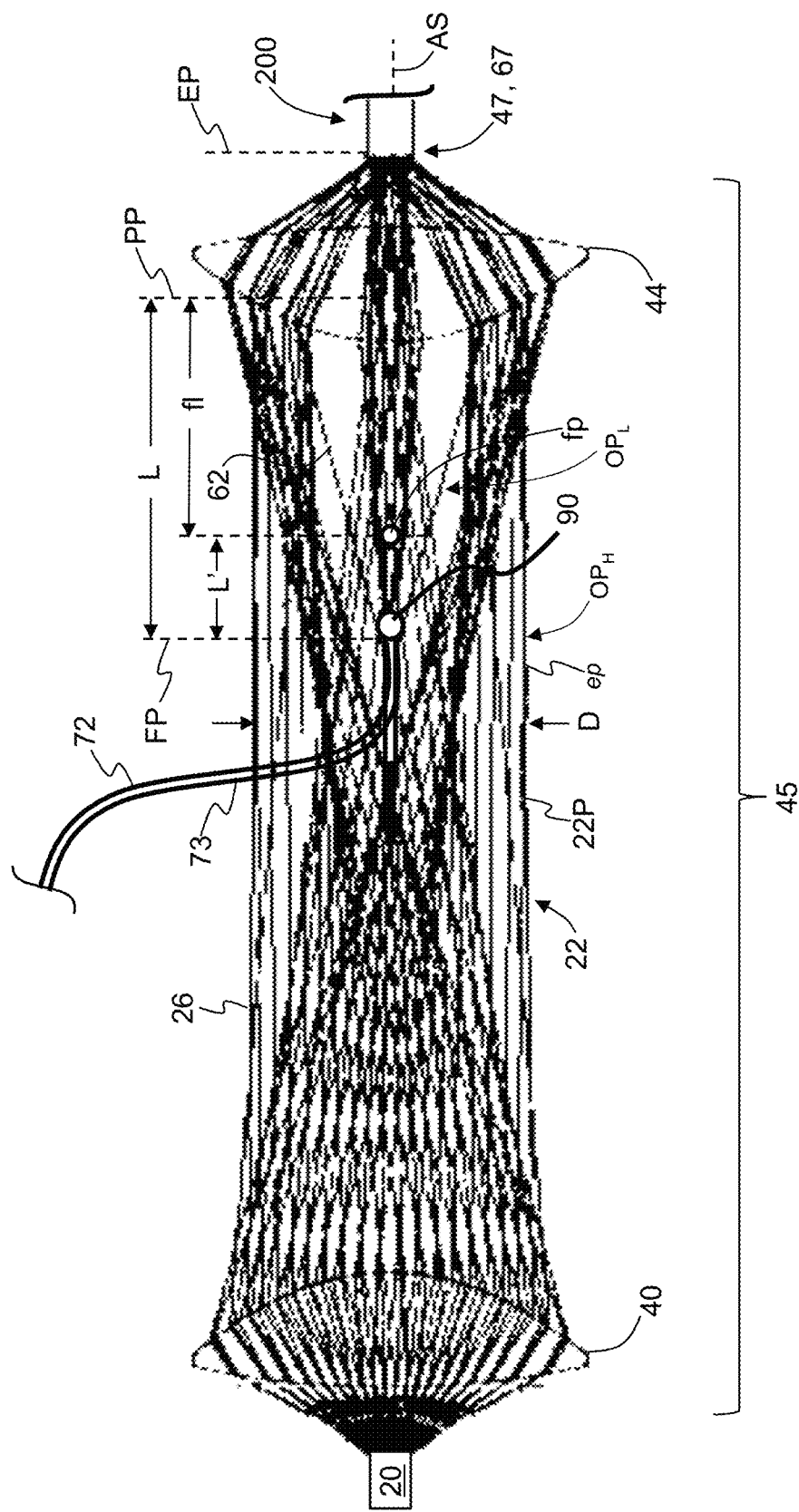
FIG. 5C is schematic diagram of the HE optical system of FIG. 5A but that shows a representation of the HE light beam traveling over the HE optical path $OP_H$ based on a ray trace simulation for an actual HE optical system.

The HE light beam 22 is represented in FIG. 5B in a simplified manner using two extreme light rays for ease of illustration. FIG. 5C is a schematic diagram of the HE optical system 45 similar to that shown in FIG. 5A but that includes a representation of the HE light beam 22 traveling over the HE optical path $OP_H$ based on a ray trace simulation using a large number of light rays for an actual example HE optical system 45. Note that the collector and condenser optical systems 40 and 44 are configured to work in tandem to direct the light rays emanating from the HE light source 20 into a relatively tight on-axis HE light distribution 47 at the exit plane EP. This HE light distribution 47 is not an image of the light source 20 as such, but rather is a non-image-based transfer of the HE light 22 as is known in the art of non-imaging illumination optical design.

The HE light beam 22 includes an expanded beam portion 22P that travels over the expanded portion of the HE optical path $OP_H$ with this expanded beam portion having the transverse (cross-axial) dimension D of the optical path $OP_H$ by definition.

With continuing reference to FIG. 5A and FIG. 5B, the light engine 10 further includes a LE light source assembly 80 that comprises by way of example a LE light source 60 in the form of a fiber light source operably supported by a LE support structure 500. The LE light source assembly 80 is considered to reside off axis, i.e., off of the axis AS because it extends from the axis AS in an off-axis direction while a relatively small portion of the LE light source assembly may reside on, near or intersect the axis and enter the HE light beam 22 through the periphery 26.

The fiber light source 60 can include a light emitter 70 that is optically coupled to a proximal section 71 ("proximal fiber section") of the fiber 72 so that the light emitter is in optical communication with the fiber. The fiber end face 76 constitutes an output end and terminates an end section 73 of the fiber ("distal fiber section"). In an example, the light emitter 70 can reside within the fiber 72 as a doped medium, as is common with fiber lasers, in which case the light emitter 70 can be a source of pump light for the fiber laser. The LE light beam 62 has a fiber wavelength band $B_F$, which is assumed to be different than the HE wavelength band $B_H$ unless otherwise noted.

Figure 17:
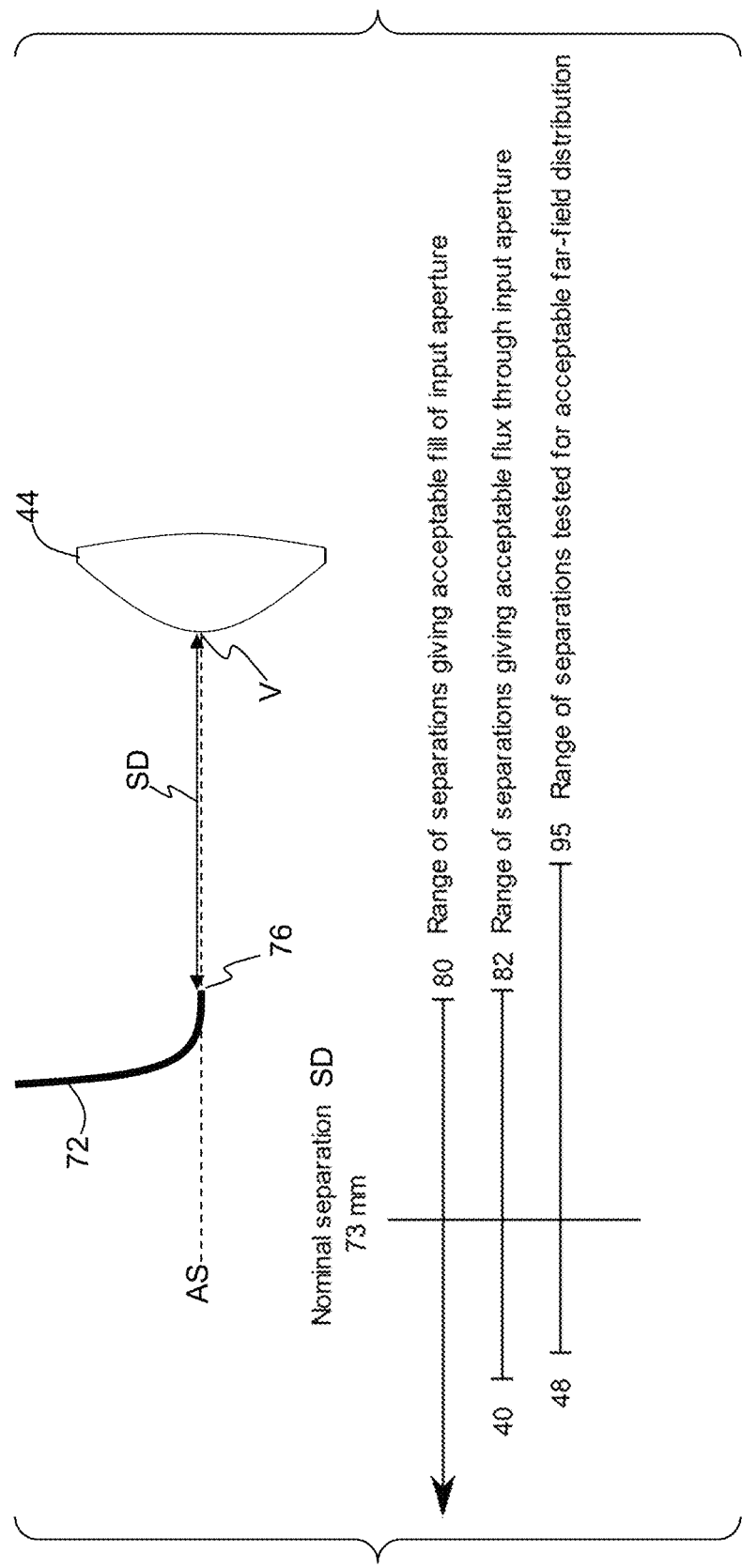
FIG. 17 is a diagram of the range of acceptable separation distances between a fiber end face of a fiber light source and the condenser optical system as determined experimentally for several criteria for an example light engine.

The fiber light source 60 is supported relative to the HE optical system 45 by the LE support structure 500 at an off-axis position, with at least the distal fiber section 73 entering the HE optical path $OP_H$ in an off-axis direction (i.e., at an angle to the axis AS), which in the example of FIGS. 5A and 5B is the −y direction. Note that the distal fiber section 73 enters the HE light beam 22 through the HE light beam periphery 26. In an example, the fiber end face 76 of the distal fiber section 73 resides on or near the axis AS and at a fiber plane FP perpendicular to, or nearly perpendicular to, the axis. In this configuration, the LE light beam 62 exiting the fiber end face 76 travels as an axial beam over a LE optical path $OP_L$ that resides within the HE optical path $OP_H$ and that expands as it heads toward the condenser optical system 44. The fiber plane FP and the primary principal plane PP are separated by an axial distance L, referred to hereinafter as the fiber distance or fiber location since the fiber distance L thus defines the location of the fiber end face 76 relative to the condenser optical system 44. The fiber distance between the fiber end face 76 and the focal point fp is the (front) focal length fl is denoted L' and is also called the fiber distance or fiber location since it is just another way of defining the axial location of the fiber end face relative to the condenser optical system 44. The fiber distance can also be measured relative to a lens vertex V, as shown in FIG. 17 and referred to therein as the separation distance SD.

Introducing the LE light beam 62 in this manner has the advantage of allowing greater flexibility in configuring the fiber distance, which in turn may enable the ability to improve efficiency of the light engine or to have increased control over the fiber light distribution at the exit plane EP.

As discussed above, in an example, the fiber light source 60 can optionally include an optical component 90 at or adjacent the fiber end face to modify or "tune" the numerical aperture $NA_F$ of the LE light beam 62 to be more compatible for use with the condenser optical system 44 as discussed below.

In the example light engine 10 of FIG. 5A and FIG. 5B, an example LE support structure 500 of the LE light source assembly 80 includes a thin planar fiber support member (hereinafter "blade") 510 that has a fiber support edge 524 at or proximate to which the fiber 72 is supported. The blade 510 is shown residing in the x-y plane but it can reside in any plane perpendicular to the y-z plane to minimize obscuration of the HE optical path $OP_H$ and the HE light beam 22. In an example, the LE support structure 500 is held in place relative to the HE optical path $OP_H$ using an adjustable mount 600 attached to the blade 510. The adjustable mount 600 can then be attached to a support frame (not shown) and can be used to adjust the position and orientation of the distal fiber section 73 (and thus the fiber end face 76) within the HE optical path $OP_H$ (and thus within the HE light beam 22) by moving (e.g., rotating and/or translating) the blade 510. Example support structures 500 and blades 510 are discussed in greater detail below. The thinness of the blade 510 makes the LE light source assembly 80 a low profile assembly.

The LE light beam 62 exiting the fiber 72 travels over the expanding fiber optical path $OP_L$ and is received by the condenser optical system 44, which directs the LE light beam to the exit plane EP and to the optional exit aperture 50 to form a fiber light distribution 67 that at least substantially overlaps with the HE light distribution 47. This combines the LE light beam 62 with the HE light beam 22 to form the multi-spectral light 150 that enters the light homogenizer 200 (see FIG. 1A).

FIG. 5C also shows the distal fiber section 73 of the fiber light source 60 arranged along the axis AS using the LE support structure 500 of FIGS. 5A and 5B (not shown in FIG. 5C) and showing the LE light beam 62 (dashed light rays) being directed by the condenser optical system 44 to form the fiber light distribution 67 at the exit plane EP.

In an example, the condenser optical system 44 of the HE optical system 45 performs two different functions. Its first function is to act in tandem with the collector optical system 40 to transfer the HE light 22 from the HE light source 20 to the exit plane EP to form the HE light distribution 47 based on non-imaging optical principles. Its second function is to transfer the LE light beam 62 from the fiber light source 60 to the exit plane EP to form the fiber light distribution 67 without the need to direct the fiber light to the condenser optical system using a light-redirecting member that resides in the expanded portion 22P of the HE light beam 22, and without having to pass either the fiber 72 or the LE light beam 62 through an aperture of an on-axis light-redirecting member.

It is noted here that the fiber end face 76 of the fiber light source 60 cannot be placed at an arbitrary location in the HE optical path $OP_H$ relative to the condenser optical system 44. The condenser optical system 44 has a given focal length and a numerical aperture. The location of the fiber end face 76 has to allow the condenser lens to properly receive and redirect the LE light beam 62 to the exit plane EP. This is complicated by the fact that the condenser optical system 44 is typically designed to work in combination with the collector optical system 40 to efficiently process the HE light beam 22 at the HE light beam wavelength band $B_H$. Consequently, positioning the fiber end face 76 in the HE optical path $OP_H$ requires accounting for the different LE light beam wavelength band $B_F$ and the different fiber optical path $OP_E$, as well as the acceptance numerical aperture of the light homogenizer 200. The different considerations required in properly placing the fiber end face 76 in the HE optical path $OP_H$ are discussed below.

b) Second Example Light Engine

Figure 6:
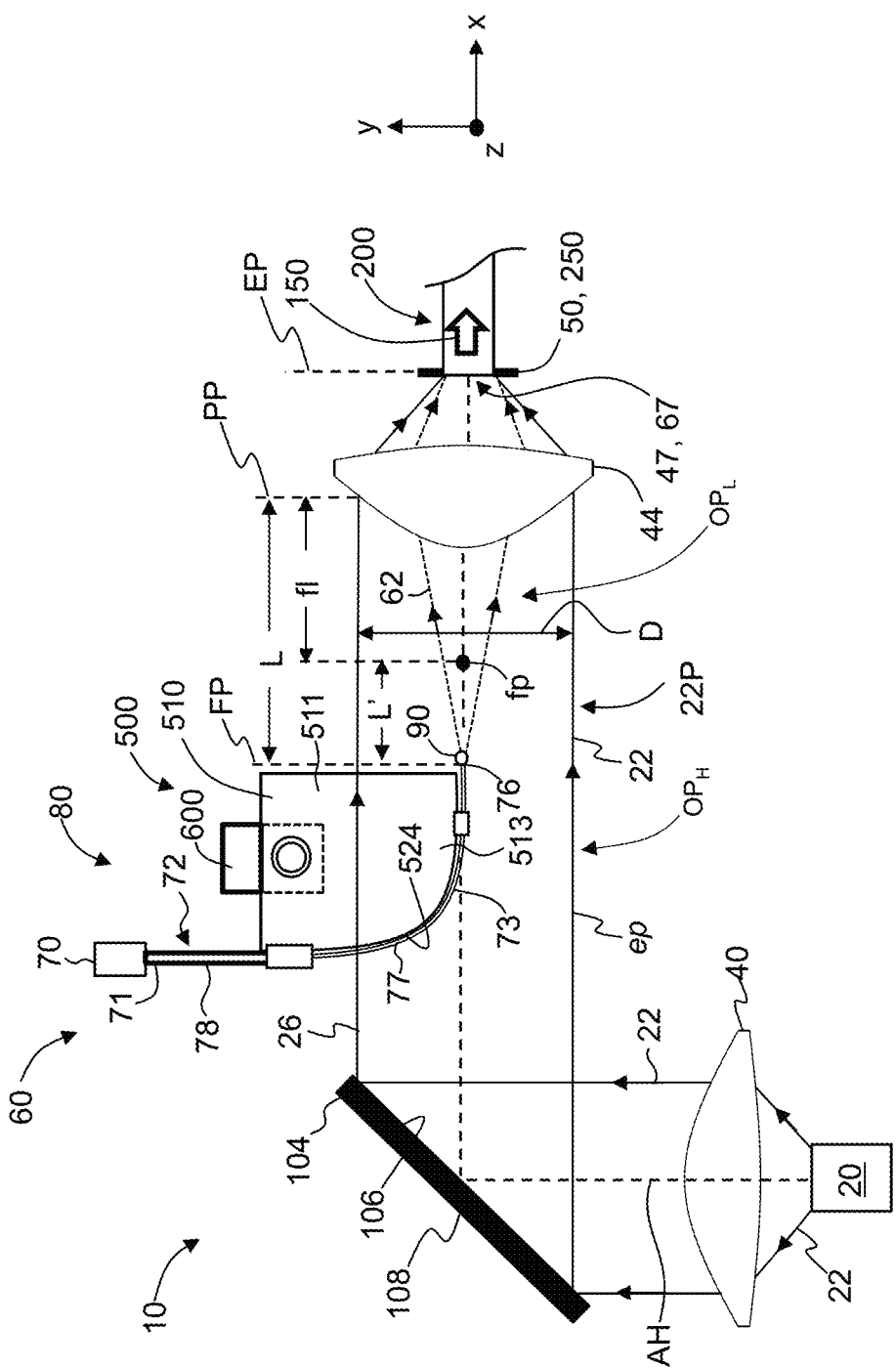
FIG. 6 is a schematic diagram of a second example light engine that employs a light-redirecting member and a single LE light source assembly between the light-redirecting member and the condenser.

FIG. 6 is a schematic diagram of a second example light engine 10 similar to that shown in FIG. 5B but that includes a light-redirecting member 104 that receives the HE light beam 22 from an off-axis HE light source 20 initially traveling along a HE axis AH and redirects it to travel along the axis AS. The LE light source assembly 80 has the same or substantially the same configuration as that in FIG. 5A and FIG. 5B, or one of the different configurations as described below. This folded configuration of the example light engine 10 makes it more compact.

Such folded light engines 10 employing light-redirecting members 104 have been used in the prior art to introduce the fiber light source 60 along the axis AS', with the fiber light source residing behind the light-redirecting member. FIG. 7A and FIG. 7B illustrate the prior art examples. FIG. 7A shows a fiber 2 arranged at or adjacent a light-redirecting member 4 disposed relative to a light beam 22' emitted from a light source 20' and collimated by a collector lens 40'. The light-redirecting member redirects the light beam 22' and has an aperture 6 so that either the fiber 2 itself or a LE light beam 8 exiting the fiber passes through the aperture along the axis AS'. FIG. 7B is similar to FIG. 7A and shows a prior art configuration where the LE light beam 8 is directed through the central aperture 6 of the light-redirecting member 4 using an focusing lens 3.

The prior art approaches to introducing a LE light beam into the HE optical path $OP_H$ of an HE optical system directly along the axis AS from behind the light-directing member have a number of disadvantages. One disadvantage is that it requires a light-redirecting element 4 to fold the HE optical path $OP_H$ to provide an access location for the fiber light source (not shown), which resides on axis and behind the light-redirecting member. Further, the light-redirecting element 4 needs to have an aperture 6 to provide access to the HE optical path $OP_H$. Another disadvantage is that the addition of an extra light-redirecting member adds cost and complexity to the light engine 10, as well as an additional source of optical loss and system misalignment. Yet another disadvantage is that a second downstream light-redirecting member may physically prevent the fiber axially inserted through the upstream light-redirecting member from being placed at a proper position relative to the condenser lens to obtain proper light transfer of the LE light beam to a downstream light homogenizer.

FIG. 8A and FIG. 8B are close-up schematic diagrams that further illustrate two examples of how the LE light source assembly 80 is used to place the fiber 72 of the fiber light source 60 within the HE system optical path $OP_H$ without passing the fiber 72 or the LE light beam 62 through an aperture of a light-redirecting member, and without having to place the fiber light source in the space behind the light-redirecting member.

The example of FIG. 8A shows how the distal fiber section 73 of the fiber light source 60 is disposed directly in the HE optical path $OP_H$ between the collector optical system 40 and the light-redirecting member 104 using the LE light source assembly 80.

The example of FIG. 8B shows how the distal fiber section 73 of the fiber light source 60 is disposed directly in the HE optical path $OP_H$ between a first light-redirecting member 104A and a second downstream wavelength-selective light-redirecting member 104B. The wavelength-selective light-redirecting member 104B is configured to transmit the LE light beam 62 emitted from the fiber end face 76 and to transmit a first HE light beam from a first HE light source 20A and to reflect an HE light beam 22B from a second HE light source 20B.

The light-redirecting members 104 and 104A in FIG. 8A and FIG. 8B respectively do not include an aperture. The need for such an aperture is obviated by introducing the fiber 72 into the HE optical path $OP_H$ from an off-axis position and in an off-axis direction so that it resides downstream of the light-redirecting member 104 (or 104A) at a select position in the HE optical path relative to the condenser optical system 44.

c) Third Example Light Engine

Figure 9:
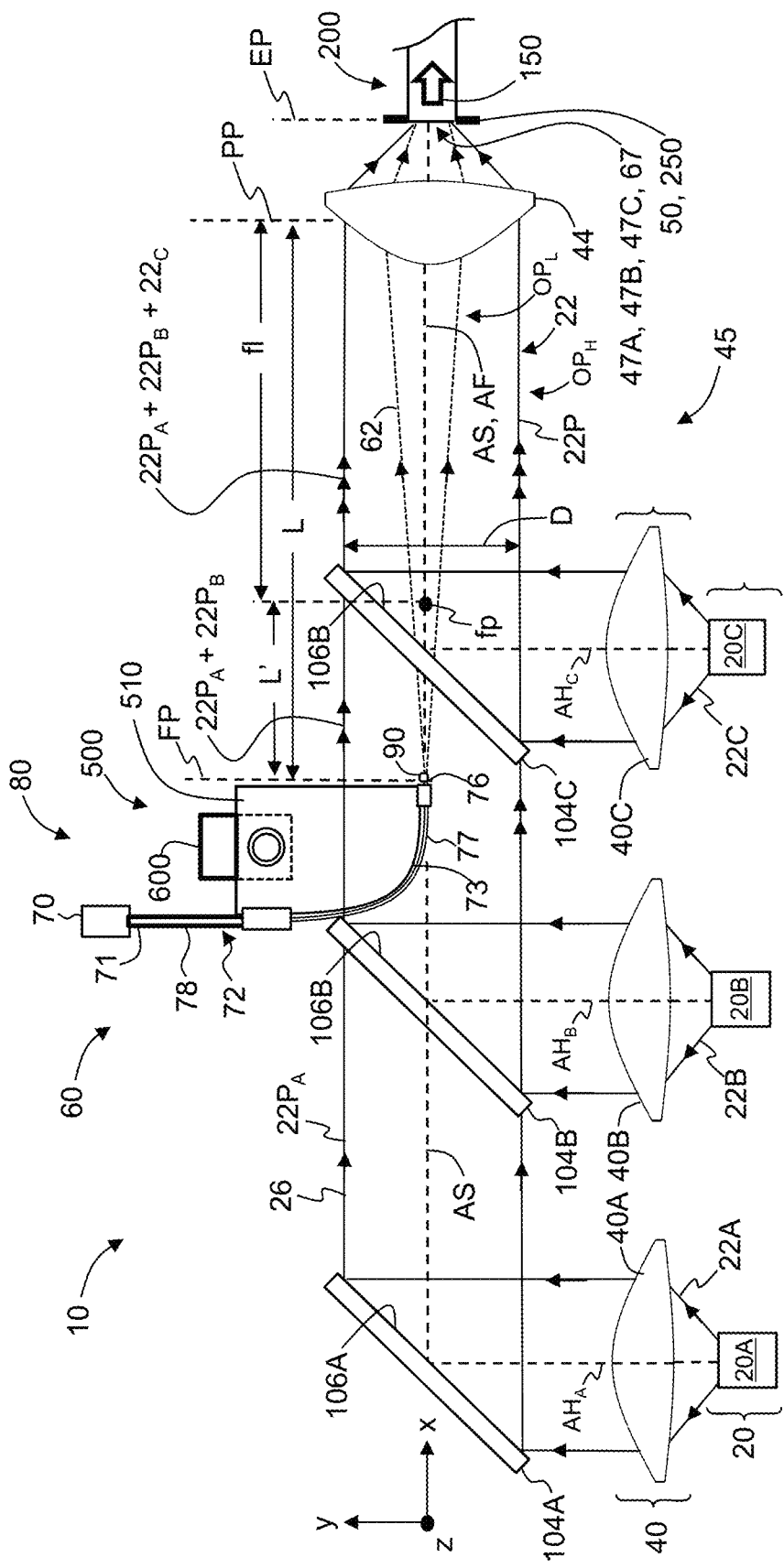
FIG. 9 is a schematic diagram of a third example light engine that employs a light-redirecting member and a single LE light source assembly residing between two wavelength-selective light-redirecting members.

FIG. 9 is a schematic diagram of a third example light engine 10 similar to that of FIG. 8B, but wherein the light engine 10 of FIG. 9 has three off-axis HE light sources 20, denoted 20A, 20B and 20C having respective HE axes $AH_A$, $AH_B$ and $AH_C$. These HE light sources 20A, 20B and 20C generate respective HE light beams 22A, 22B and 22C having respective HE wavelength bands $B_{HA}$, $B_{HB}$ and $B_{HC}$. Three light-redirecting members 104A, 104B and 104C are operably arranged along the axis AS to intersect the corresponding HE axes $AH_A$, $AH_B$ and $AH_C$ to re-direct the initially off-axis HE light beams 22A, 22B and 22C to travel as axial beams toward the condenser optical system 44 over the HE optical path $OP_H$.

In an example, the HE light beams 22A, 22B and 22C respectively have different (but optionally overlapping) wavelength bands $B_A$, $B_B$ and $B_C$, so that the light-redirecting members 104B and 104C are wavelength selective, and in an example comprise dichroic mirrors. The light-redirecting member 104B is configured to transmit the HE light beam 22A while reflecting the HE light beam 22B. Likewise, the light-redirecting member 104C is configured to transmit the HE light beams 22A and 22B while reflecting the HE light beam 22C. The light-redirecting member 104A need only be configured to reflect the HE light beam 22A and can comprise a broad-band reflecting fold mirror. Each of the HE light sources 20A, 20B and 20C has a corresponding expanded portion $22P_A$, $22P_B$ and $22P_C$ as formed by the corresponding collector optical systems 40A, 40B and 40C. The condenser optical system 44 forms from the three HE light beams 22A, 22B and 22C the respective HE light distributions 47A, 47B and 47C at the exit plane EP.

An example LE light source assembly 80 is disposed relative to the HE optical system 45 such that the distal fiber section 73 of the fiber 72 enters the HE optical path $OP_H$ and the overlapping expanded portions $22P_A$ and $22P_B$ of HE light beams 22A and 22B traveling therein, with the fiber end face 76 residing on the axis AS and at the fiber plane FP. The condenser optical system 44 forms from the LE light beam 62 the fiber light distribution 67 at the exit plane EP so that it at least partially overlaps with the HE light distributions 47A, 47B and 47C, thereby forming the multi-spectral light 150. In an example, the fiber wavelength band $B_F$ is different from the HE wavelength bands $B_{HA}$, $B_{HB}$ and $B_{HC}$, and further in an example does not substantially overlap the HE wavelength bands $B_{HA}$, $B_{HB}$ and $B_{HC}$.

In the example light engine 10 of FIG. 9, the distal fiber section 73 of the fiber light source 60 is operably disposed within the HE optical path $OP_H$ between adjacent wavelength-selective members, namely 104B and 104C using the LE support structure 500 of the LE light source assembly 80. Note again that there is no need for an aperture in the upstream light-redirecting member 104B for inserting the distal fiber section 73 into the HE optical path $OP_H$.

d) Fourth Example Light Engine

Figure 10A:
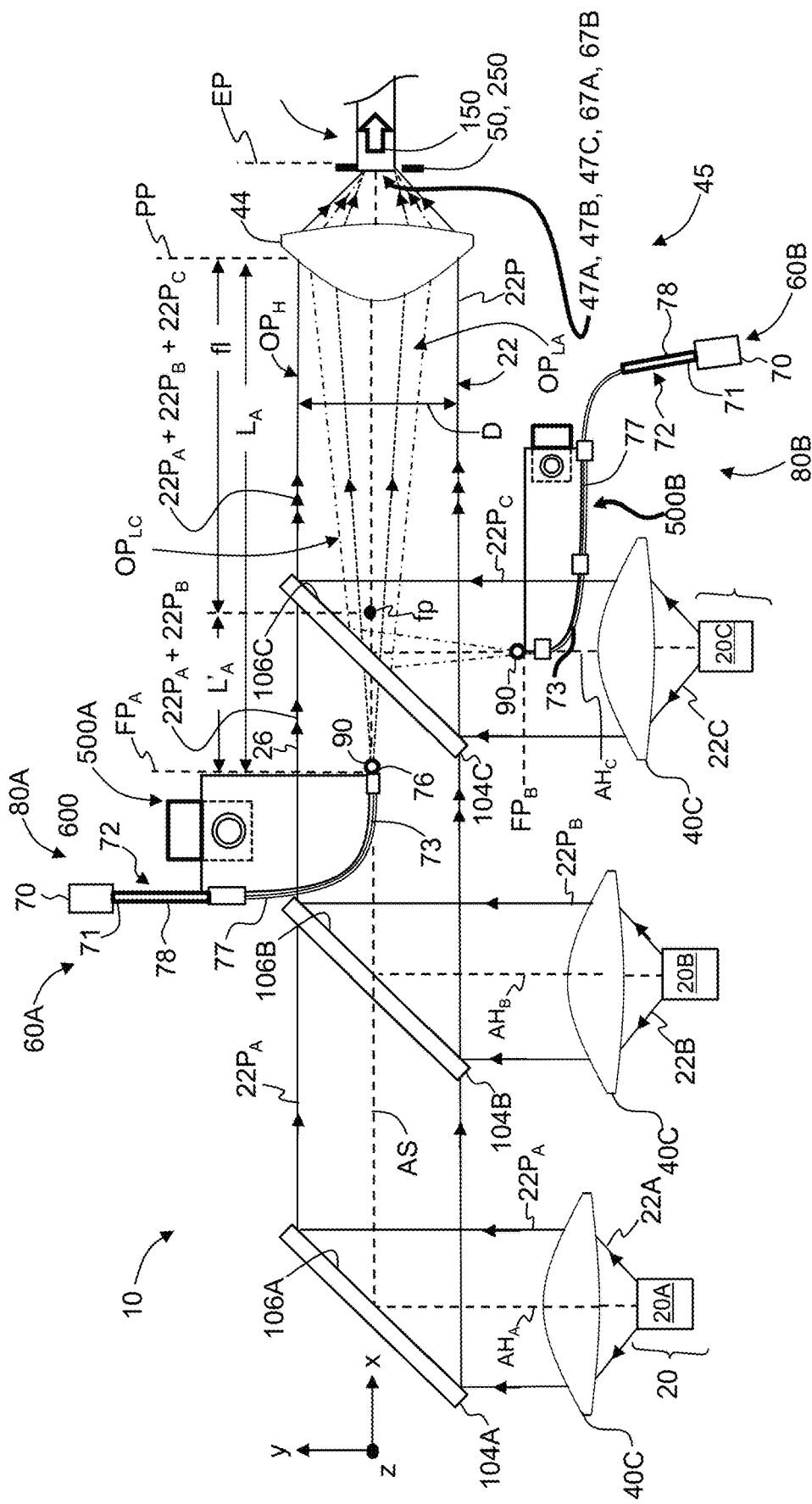
FIG. 10A is a schematic diagram of a fourth example light engine similar to FIG. 9 and that employs a second off-axis light-redirecting member residing between a third HE light source and a third wavelength-selective light-redirecting member.
Figure 10B:
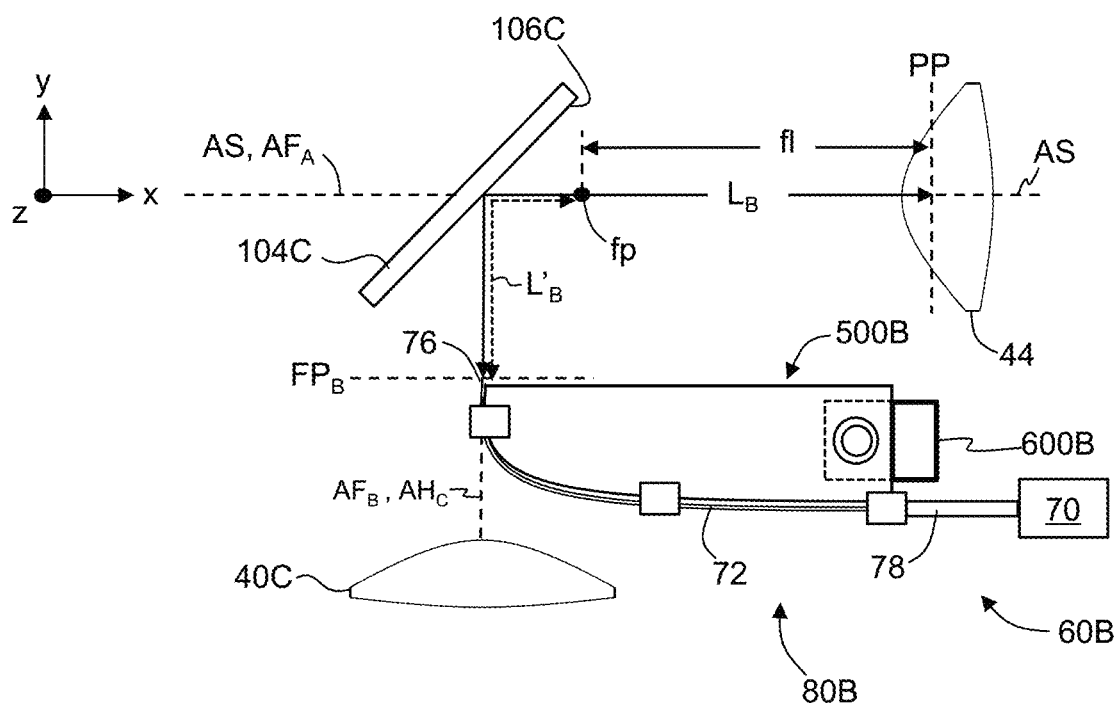
FIG. 10B is a close-up schematic diagram of the portion of the HE optical system that includes the third wavelength-selective light-redirecting member and showing the off-axis fiber locations $L_B$ and $L_B'$ relative to the condenser optical system.

FIG. 10A is similar to FIG. 9 and shows a fourth example light engine 10 that has two fiber light source assemblies 80A and 80B that respectively include fiber light sources 60A and 60B. The first LE light source assembly 80A is arranged as shown in FIG. 10A, in a manner similar to the arrangement of the assembly 80 as shown in FIG. 9. The second LE light source assembly 80B resides in the portion of the HE optical path ON associated with the third HE light beam 22C in a manner similar to that shown in FIG. 8A. In particular, the fiber end face 76 of the second fiber light source 60B resides in a second fiber plane $FP_B$ along the third HE axis $AH_C$ and at a fiber distance $L_B$ from the primary principal plane PP and between the light-redirecting member 106C and the collector optical system 40C, as shown in the close-up schematic diagram of FIG. 10B. The fiber end face 76 of the second fiber light source 60B also resides at a fiber distance $L'_B$ from the focal point fp, as also shown in FIG. 10B.

The first and second fiber light sources 60A and 60B have respective wavelength bands $B_{FA}$ and $B_{FB}$. In an example, these two wavelength bands can be the same, or have the same center wavelengths $\lambda_{FA}$ and $\lambda_{FB}$. In another example, these two wavelength bands can be substantially different.

The condenser lens system 44 now forms first, second and third HE light distributions 47A, 47B and 47C and first and second fiber light distributions 67A and 67B at the exit plane EP to form the multi-spectral light 150.

e) Fifth Example Light Engine

Figure 11A:
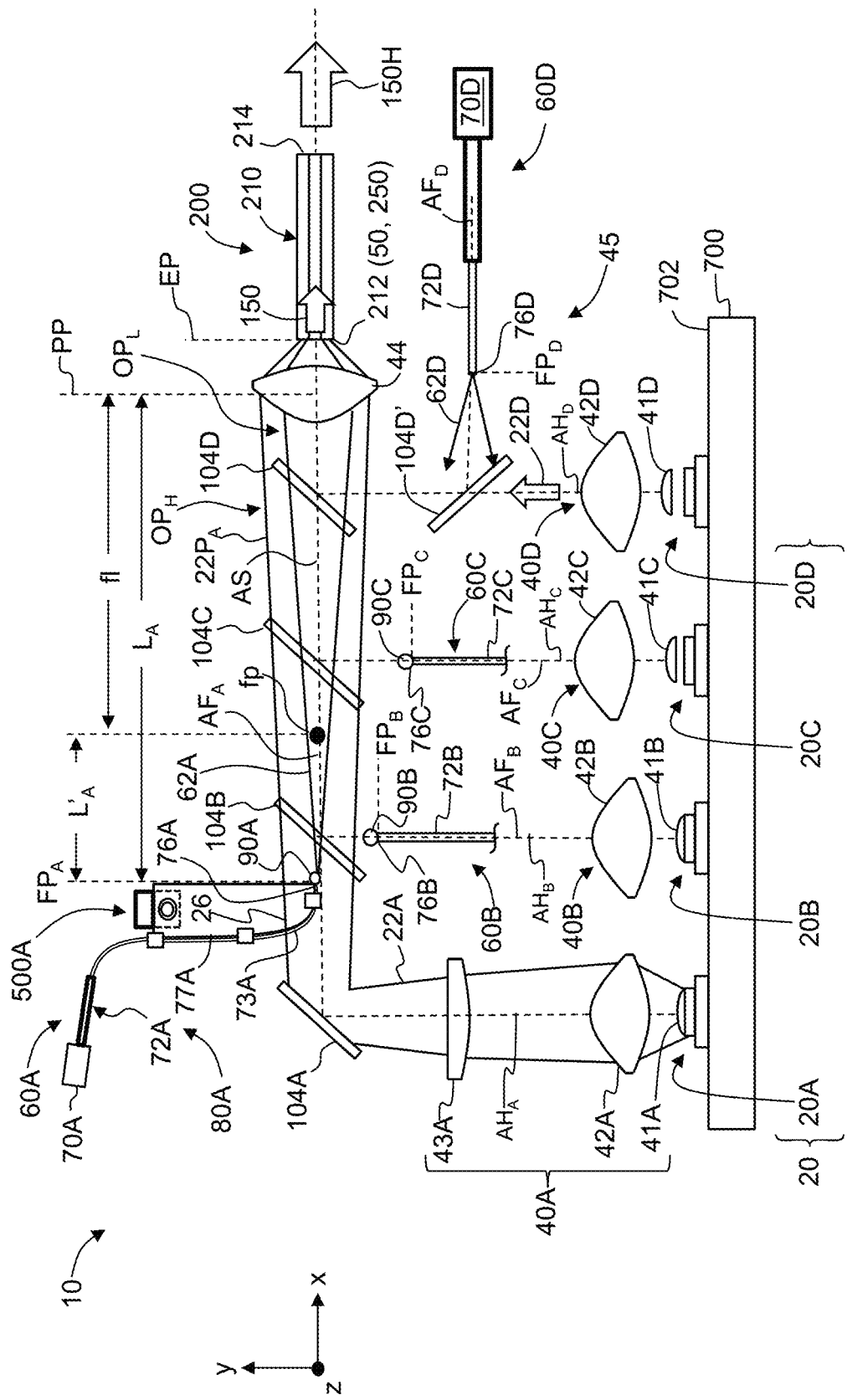
FIG. 11A is a schematic diagram of a fifth example light engine that includes four HE light sources and four fiber light source assemblies used to place four fiber light sources into different parts of the HE system optical path from their respective off-axis locations.

FIG. 11A is a schematic diagram of a fifth example light engine 10 that combines four different HE light sources 20 (20A through 20D) and four fiber light sources 60A through 60D, with the light sources 60B and 60C showing just their respective fibers 72B and 72C for ease of illustration, and where it is understood that these fibers are operably supported by corresponding support structures 500 as part of the aforementioned fiber light source assemblies 80, such as shown by way of example for the fiber light source 60A and the light source assembly 80A, which includes a blade 500A as shown.

In an example, the HE light sources 20A through 20D have respective wavelength bands $B_{HA}$, $B_{HB}$, $B_{HC}$ and $B_{HD}$ with respective center wavelengths $\lambda_{HA}$=R, $\lambda_{HB}$=G, $\lambda_{HC}$=B and $\lambda_{HD}$=UV. The collector optical systems 40A through 40D respectively include field lenses 41A through 41D operably disposed at or immediately adjacent their respective light sources 20A through 20D. The collector optical systems 40A through 40D further include respective collector lenses 42A through 42D. The collector optical system 40A includes an additional collector lens 43A that provides additional beam collimation at the $\lambda_{HA}$=R wavelength. In FIG. 11A, the only full HE light beam shown is the HE light beam 22A for the HE light source 20A, and the only full LE light beam shown is that emanating from the fiber 72A of the corresponding fiber light source 60A.

The first fiber light source 60A has a (center) wavelength $\lambda_{FA}$ in the red wavelength range, e.g., from about 635 nm to about 700 nm, such as 665 nm. The second fiber light source 60B has a (center) wavelength $\lambda_{FB}$ in the green wavelength range, e.g., from about 520 nm to about 560 nm, such as 532 nm. The third fiber light source 60C has a (center) wavelength $\lambda_{FC}$ in the blue wavelength range, e.g., from about 430 nm to about 490 nm, such as 448 nm. The fourth fiber light source 60D has a (center) wavelength $\lambda_{FD}$ in the NIR wavelength range, e.g., from about 750 nm to about 1100 nm, such as 780 nm. In an example, the third fiber light source 60C is an auxiliary light source and the light engine 10 uses mainly the first, second and fourth light sources 60A, 60B and 60D.

The fourth fiber light source 60D is shown operably disposed adjacent a fifth light-redirecting member 104D' and arranged along the fourth HE axis AHD so that it receives and redirects the LE light beam 62D to the light-redirecting member 104D and towards the condenser optical system 44. The light-redirecting member 104D' is wavelength selective since it transmits the HE light beam 22D of UV wavelength band $B_{HD}$ from the HE light source 20D while reflecting the LE light beam 62D having an IR wavelength $\lambda_{FD}$ from the fourth fiber light source 60D.

The light sources 20A through 20D are operably supported on a surface 702 of a circuit board 700. In an example, the circuit board 700 comprises wiring, light source drivers and like electronic elements (e.g., not shown) for powering and controlling/driving the light sources.

In an example, the fibers 72A and 72B have cores 74 (see FIG. 3B) of diameter 400 microns and numerical apertures $NA_{FA}$ and $NA_{FB}$ of about 0.22. Respective optical components 90A and 90B are used to reduce the numerical apertures $NA'_{FA}$ and $NA'_{FB}$ of the LE light beams 62A and 62B to be about 0.15 using one or more of the configurations described above, such as the ball lens configurations of FIGS. 4C and 4D. In an example, the ball lens optical components 90A and 90B contact their respective fiber end faces 76A and 76B and have diameters of 2.4 mm. In an example, the condenser optical system 44 consists of a single aspherical optical element having a focal length $f_{44}$=22 mm and a numerical aperture $NA_{44}$=0.6. Likewise, in an example, the lenses 42A through 42D of the corresponding collector optical systems 42A through 42D are also aspherical lens elements with focal lengths of 22 mm.

The light homogenizer 200 comprises in an example a light pipe 210 having an input end 212 and an output end 214. The light pipe 210 is arranged along the axis AS with the input end 212 residing in the exit plane to define the exit aperture 50 of the HE optical system as well as the input aperture 250 of the light homogenizer. In an example, the input end of the light pipe has a width of 4 mm and has a hexagonal cross-sectional shape (i.e., six light-reflecting facets). The light pipe 210 serves to receive the multi-spectral light 150 at the input end 212 and homogenize the multi-spectral light by internal reflections as the multi-spectral light travels down the length of the light pipe. The outputted homogenized multi-spectral light 150H relaxes the tolerances on the placement of the fiber end face(s) 76 of fiber light-source(s) 60 along the axis AS relative to the condenser optical system 44.

Figure 11B:
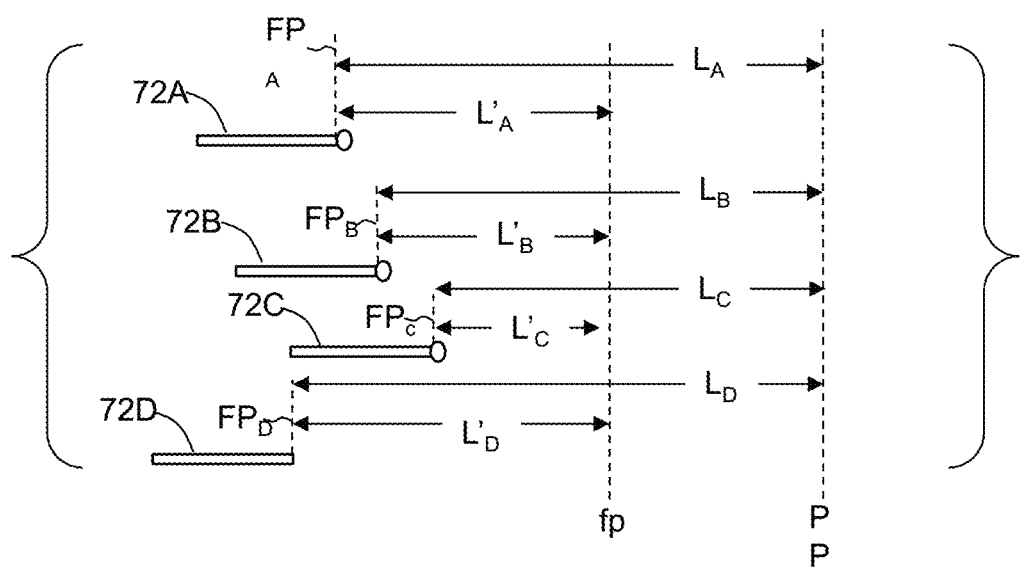
FIG. 11B is a schematic diagram that shows the fiber locations for the four fibers in the example light engine of FIG. 11A.

FIG. 11B is a schematic diagram illustrating the fiber distances $L_A$, $L_B$, $L_C$ and $L_D$ as well as the fiber distances $L'_A$, $L'_B$, $L'_C$ and $L'_D$ for the fiber planes $FP_A$, $FP_B$, $FP_C$ and FP. Due to the different wavelengths $\lambda_{FA}$ through $\lambda_{FD}$ of the fiber light sources 60A through 60D, the distances $L_A$, $L_B$, $L_C$ and $L_D$ may vary from one another, so that the fiber distances $L'_A$, $L'_B$, $L'_C$ and $L'_D$ may also vary from one another. In an example, the fiber distances $L_A$ through $L_D$ and $L'_A$ through $L'_D$ are selected to either fill or slightly overfill the input end 212 of the light pipe 210 with each of the LE light beams 62A through 62D.

Figure 11C:
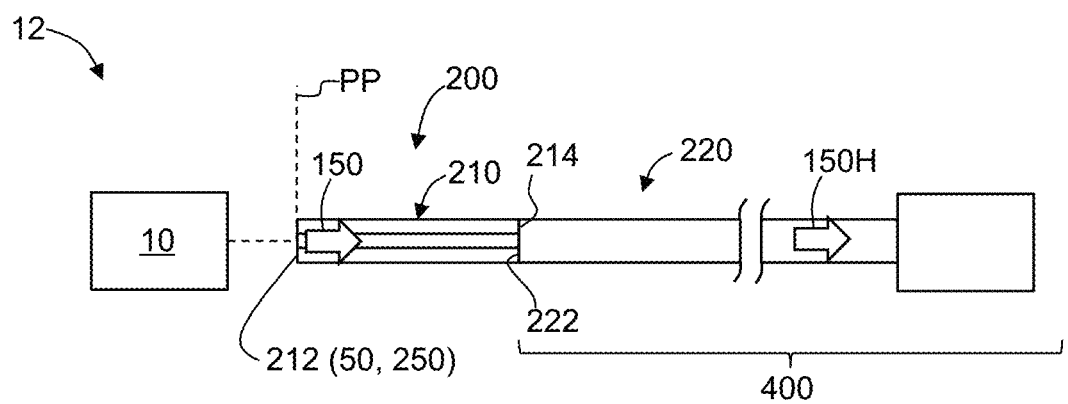
FIG. 11C is a schematic diagram of an example multi-wavelength imaging system employing the fourth example light engine of FIG. 11A and an example light homogenizer in the form of a light pipe.

With reference to FIG. 11C and also to FIG. 11A, the homogenized multi-spectral light 150H outputted from the output end 214 of the light pipe 210 is inputted into the input end 222 of an optical light guide cable 220 of a multi-spectral device 400. In an example, the optical light guide cable comprises a fiber bundle, e.g., a 5 mm optical fiber bundle, and can comprise a medical light guide cable. The multi-spectral (combined) light carried by the optical light guide cable 220 when used as a medical light guide cable can be used for endoscopic, laparoscopic and open-field video imaging systems offering, in addition to conventional white light imaging, fluorescence visualization of multiple fluorophores. In an example, the end face 76 of the optical fiber (light guide) 72 is placed relative to the condenser optical system 44 to obtain a light distribution from the optical light guide cable that meets or exceeds a select light distribution tolerance. Information about placing the end face 76 of the optical fiber (light guide) 72 relative to the condenser optical system 44 is presented below. An example light distribution tolerance can include limits on the spatial variation in intensity or like measure and/or a minimum overall average intensity or like measure.

In some examples, the optical power of the collector optical system 40 may vary with aperture, so that the power of the collector optical system 40 is different within the region that the LE light beam 62 is configured to travel through than the power of the system 40 outside of that region. If the LE light beam 62 has a different wavelength band than the HE light beam 20, then the collector optical system will have different optical power for these two beams. Employing an optical component 90 at or proximate to the fiber end face 76 can be used to ensure that the LE optical path $OP_L$ that resides within the HE optical path ON is formed to accomplish the goal of directing the LE light beam 62 and the HE light beam 22 to be directed to a common location at the exit plane EP.

Additional Example Fiber Light Source Configurations

There are a variety of ways in which one or more fiber light source 60 can be disposed relative to the HE optical system 45 using the fiber light source assemblies 80 disclosed herein to cause one or more LE light beams 60 to be emitted to travel over their respective optical paths $OP_{EA}$ and $OP_{EB}$ within one or more expanded portions 22P of one or more HE light beams 22 traveling over the HE optical path $OP_H$.

Figure 12A:
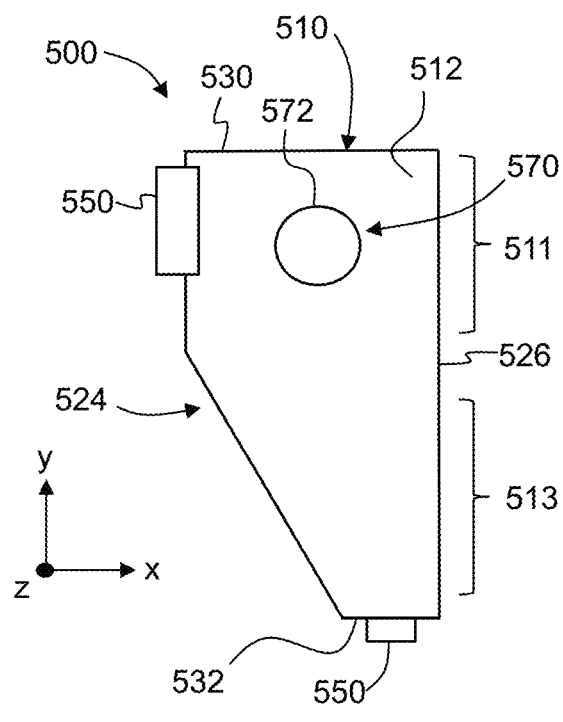
FIGS. 12A through 12C are side views (looking in the −z direction) of three example support structures, each having substantially the same low-profile configuration.
Figure 12B:
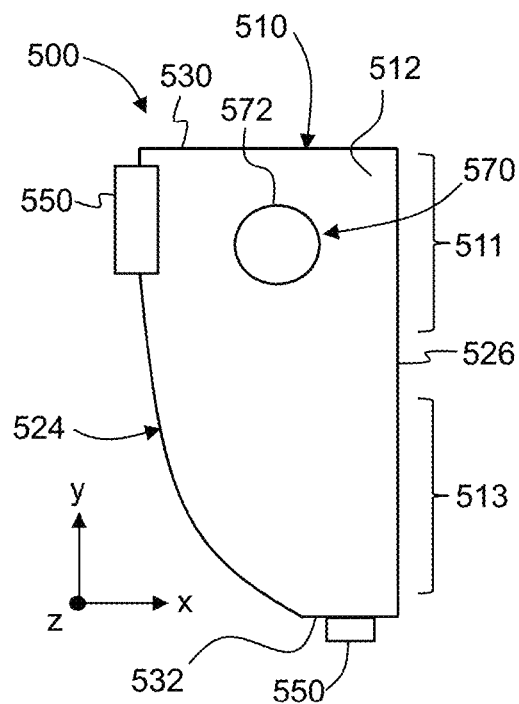

FIG. 12B illustrates another example fiber light source configuration wherein the fibers 72A and 72B are combined into a single or main fiber 72M supported by the blade 500 of the LE light source assembly 80 so that the guided light 62AG and 62BG from these light sources are combined (multiplexed) onto the main fiber 72M. This can be accomplished using for example a fiber router or fiber multiplexer, optical splicing, etc. In the example in FIG. 12B, the two fibers 72A and 72B are optically connected to the main fiber 72M using an optical coupler 95. The main fiber 72M has its end face 76M residing in the fiber plane FP and in the example is centered on the axis AS. The two LE light beams 62A and 62B exit the main fiber end face 76M and travel toward the condenser optical system 44. In the case shown in FIG. 12B, the two LE light beams 62A and 62B have different fiber wavelengths $\lambda_{FA}$ and $\lambda_{FB}$ so that they have different divergence angles, i.e., different numerical apertures $NA_{FA}$ and $NA_{FB}$. This means that the light rays of the two LE light beams 62A and 62B will converge onto the exit plane EP at different angles as well, which means that they will enter the light homogenizer 200 over different angular ranges, i.e., at different numerical apertures. In an example, the fiber position L is chosen to optimize optical coupling efficiency (light transfer) of both LE light beams 62A and 62B through the exit aperture 50. This may mean placing the fiber plane FP at an intermediate position between the optimum position for each of the two LE light beams 62A and 62B when these beams are considered separately.

Example Support Structures and Fiber Light Source Assemblies

Figure 12C:
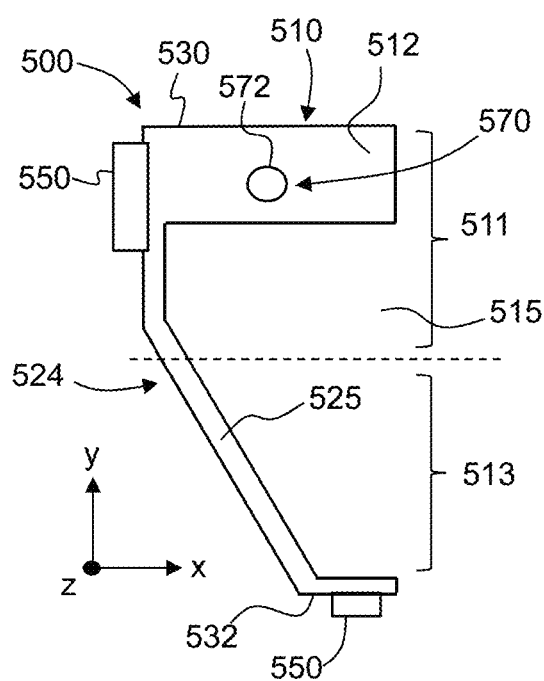
Figure 13:
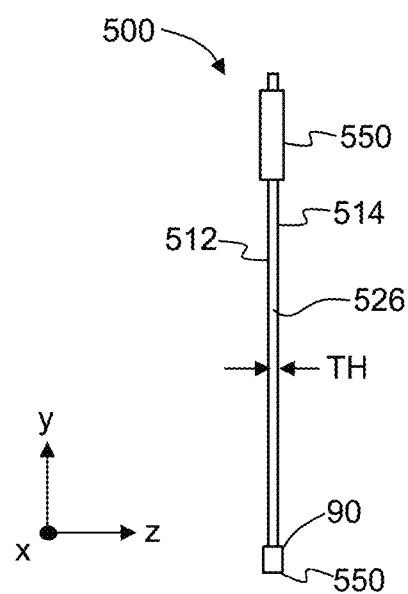
FIG. 13 is an edge-on view (looking in the −x direction) of the three example support structures of FIG. 12A through 12C.

FIGS. 12A through 12C are side views (looking in the $-z$ direction) of three example support structures 500, each having substantially the same low-profile configuration as shown in the edge-on view (looking in the $+x$ direction) of FIG. 13.

In the two examples of LE support structure 500 depicted in FIG. 12A and FIG. 12B, the blade 510 has opposite surfaces 512 and 514 and an edge thickness TH. The edge thickness TH of the blade 510 may be chosen to be as thin as possible so that the amount of loss in flux due to obscuration of a HE light beam 22 by the blade 510 is typically on the order of a few percent or less, and preferably less than about 2% or even more preferably less than about 1%. In some examples, the thickness TH of the blade 510 is less than or equal to the diameter of the fiber core 74.

The blade 510 has a fiber support edge 524 where the fiber 72 is supported when forming the LE light source assembly 80. At least a portion of the fiber support edge 524 can be curved, as shown in FIG. 12B. In the example of FIG. 12A, a portion of the fiber support edge 524 is angled. The example blade 510 also has an edge 526 opposite the fiber support edge 524. The blade 510 has first and second opposite ends 530 and 532, respectively referred to as the top and distal ends for ease of discussion. It is also convenient to divide the blade 510 into a proximal section 511 that includes the proximal end and a distal section 513 that includes the distal end. The blade 510 is shown residing in the x-y plane. The blade 510 defines a blade plane (also called a support member plane) BP (see FIGS. 14A, 14B).

Figure 14A:
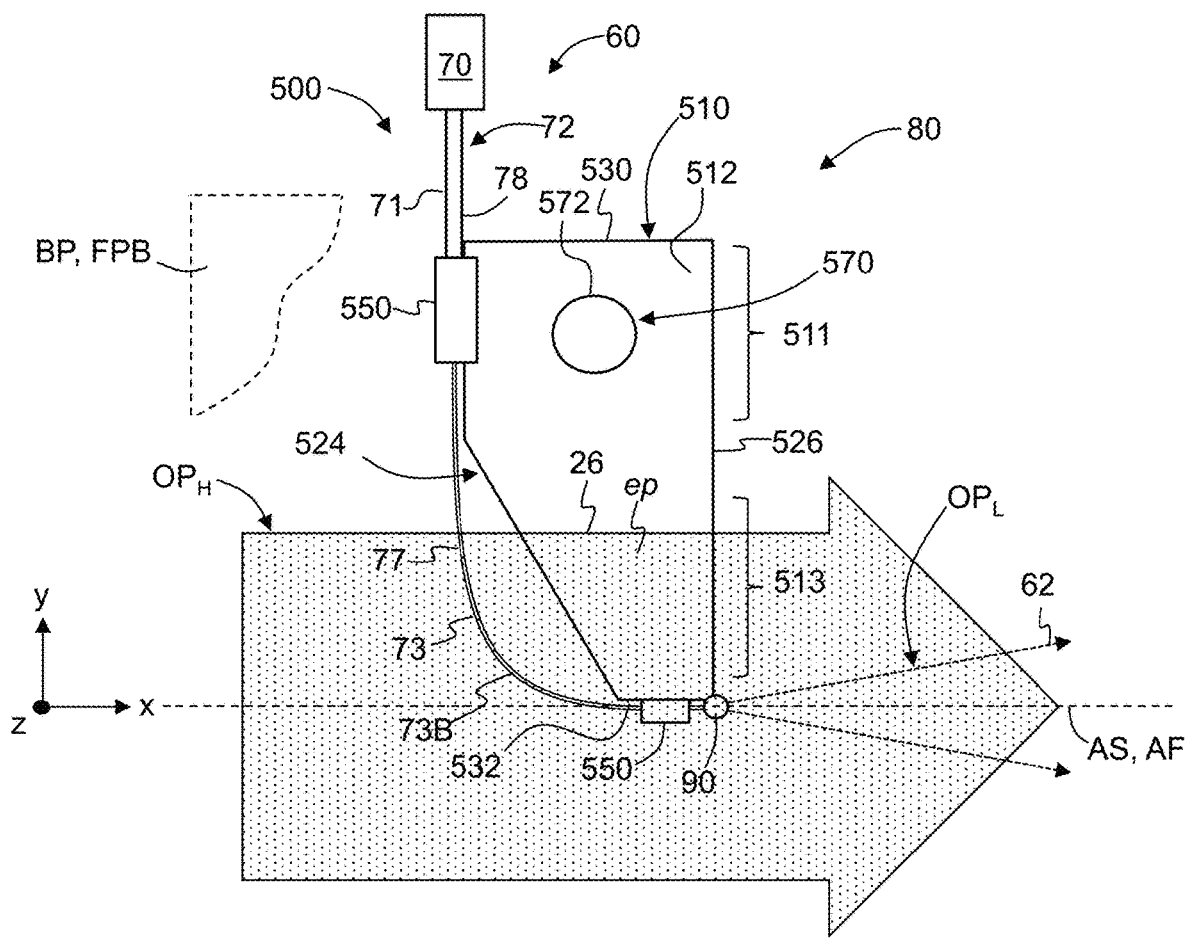
FIG. 14A and FIG. 14C through FIG. 14F show example fiber light source assemblies that employ different example support structures and illustrating examples of how the fiber light source assemblies support the fiber of the fiber light source within the HE optical path and within the HE light beam traveling over the HE optical path.
Figure 14B:
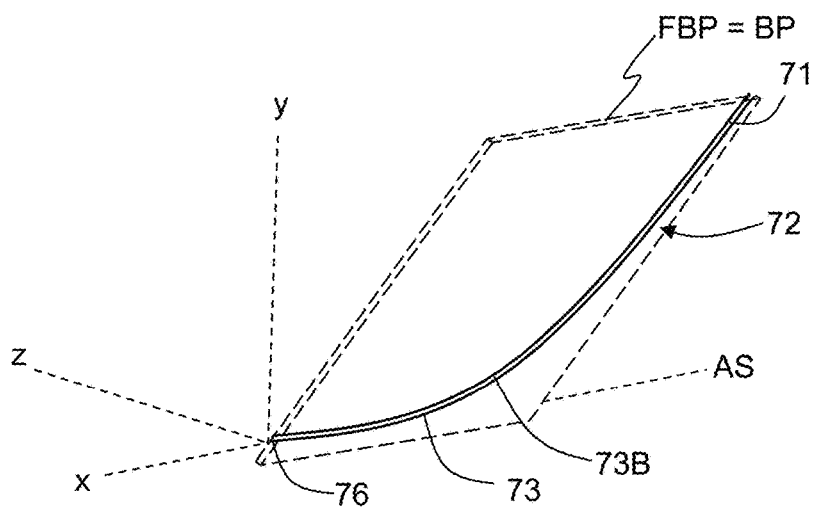
FIG. 14B is a schematic diagram that shows the co-planar fiber bend plane and support member (blade) plane relative to the axis AS and oriented perpendicular to the y-z plane.

In an example, the LE support structure 500 includes one or more fiber securing features 550 at the fiber support edge 524 and configured to secure the fiber 72 to the blade at or proximate to the fiber support edge while bending the fiber so that the fiber resides in the blade plane BP (see FIGS. 14A and 14B). Two example fiber securing features 550 are shown by way of example in FIGS. 12A and 12B, with one residing in the proximal section 511 and one residing in the distal section 513 at the distal end 532. In an example, the one or more fiber securing features can comprise a securing material, such as an adhesive (e.g., a light-curable adhesive).

The LE support structure 500 can also include a mounting feature 570 used to mount the blade 510 to a mounting structure 600. In an example, the mounting feature 570 is a hole through which a securing element 580, such as a bolt or screw, can be used to secure the blade to the mounting structure (see e.g., FIG. 15B). The mounting feature 570 can be any mounting feature known and used in the art and in an example allows for movably supporting the blade 510 to provide for adjustability in placing the fiber 72 within the HE optical system 45 and for being secured to maintain the fiber position.

With reference now to FIG. 14A, the fiber 72 is secured to the blade 510 by the securing features 550 to form a bend 73B in the plane of the blade 510, i.e., in the blade plane BP. FIG. 14B is a close-up schematic diagram that shows the fiber 72 having bend 73B in the distal fiber section 73 to define a fiber bend plane FBP that coincides with the blade plane BP. FIG. 14B illustrates an example where the fiber bend plane FPB and the blade plane BP can reside in any plane that is substantially perpendicular to the y-z plane, with the axis AS running in the +x direction.

This bent fiber configuration as supported and maintained by the blade 510 allows for a portion of the fiber light source 60 to remain off axis while the distal fiber section 73 is selectively oriented within the HE optical path $OP_H$ of the HE optical system 45. In an example, the proximal fiber section 71 is supported at or close to the proximal end 530 of the blade 510 while the distal fiber section 73 is supported at or close to the distal end 532.

Figure 14C:
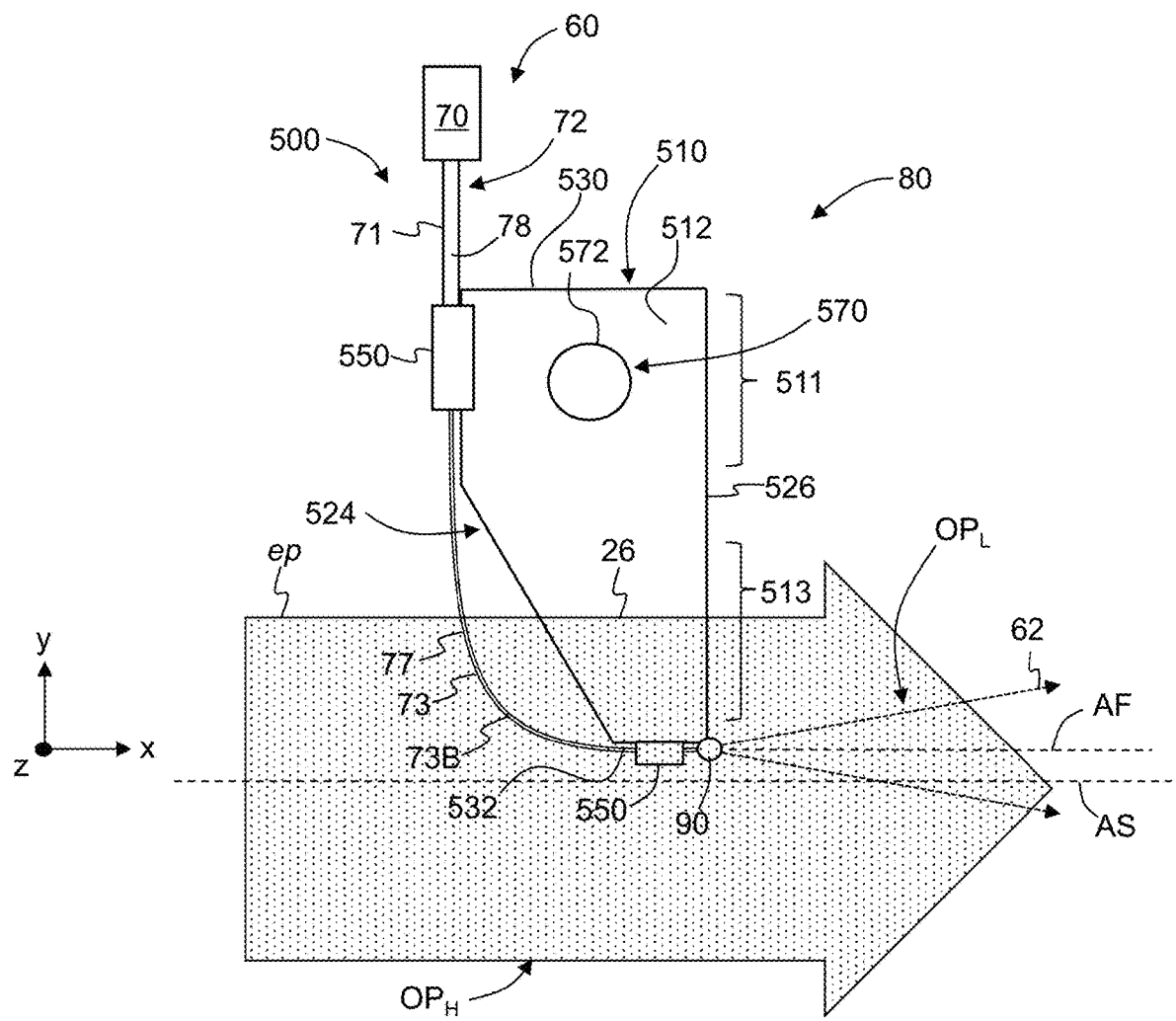

In another example shown in FIG. 14C, the fiber 72 is oriented such that the fiber axis AF is offset from but parallel to the axis AS. In yet another example shown in FIG. 14D, the fiber 72 is oriented such that the fiber axis AF is at an angle to the axis AS.

Figure 14D:
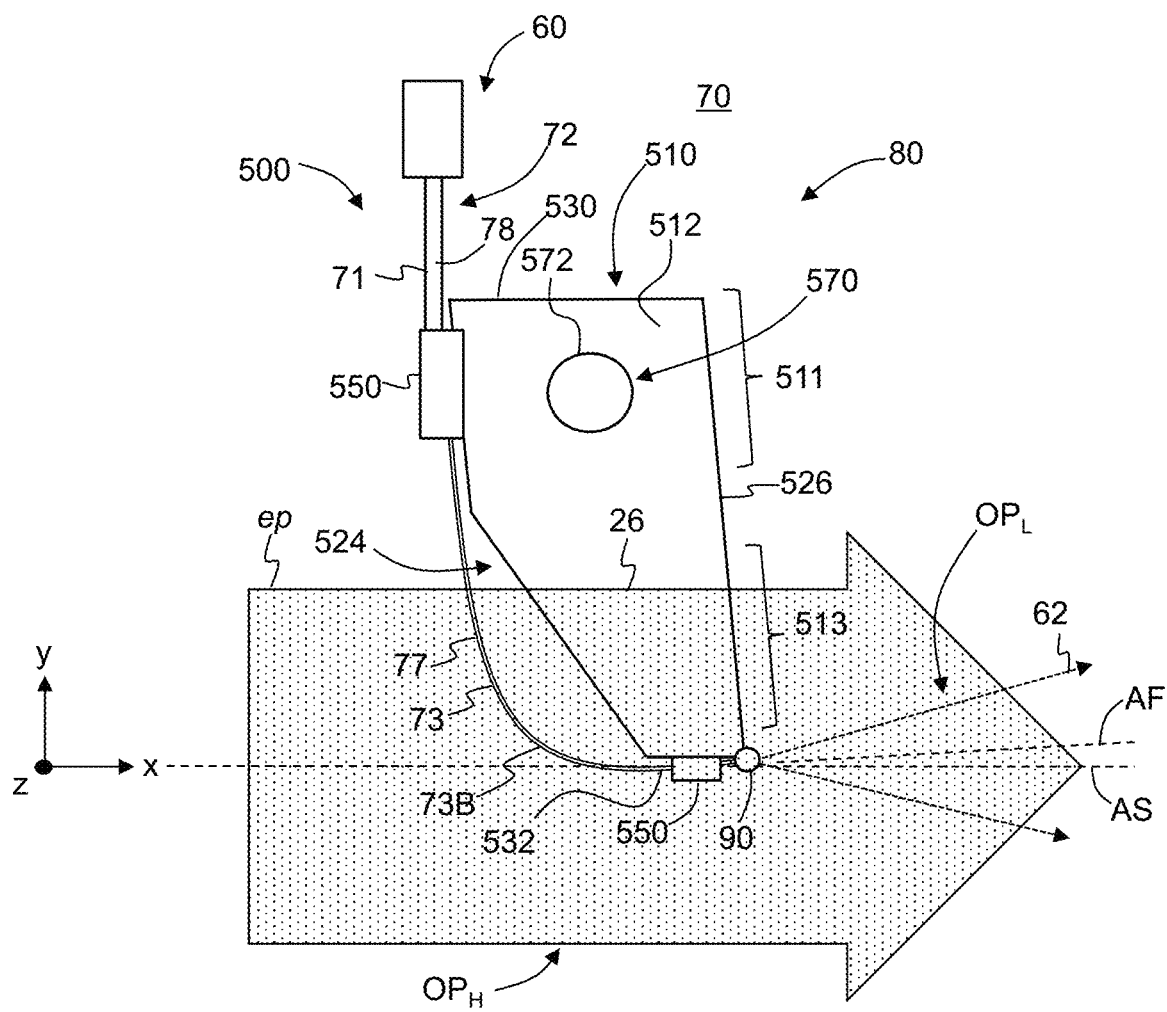
Figure 14E:
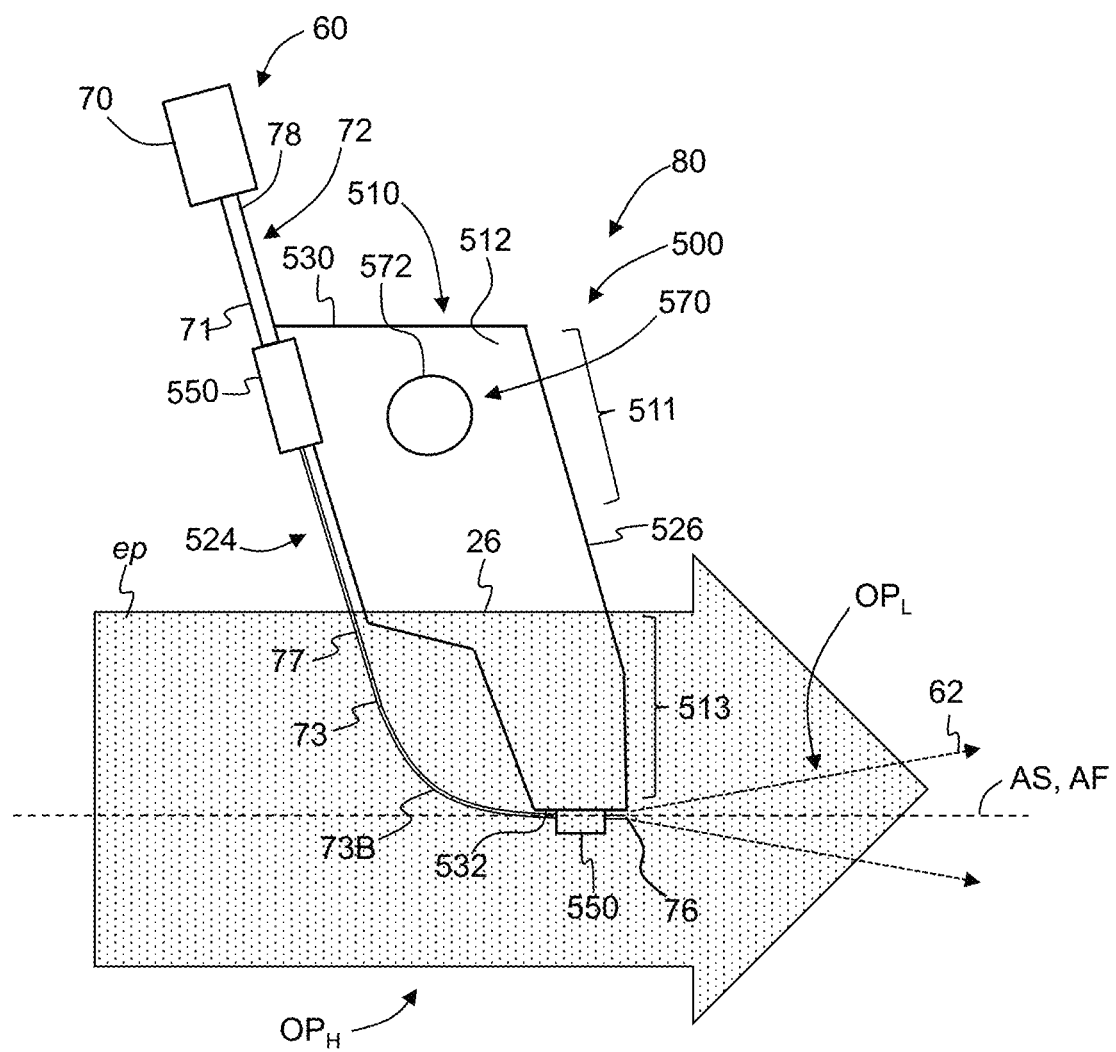

FIG. 14E is similar to FIG. 14A and illustrates an aspect of the LE support structure 500 of the LE light source assembly 80 wherein the blade 510 has an angled fiber support edge 24 so that the fiber 72 can be brought into the HE light beam 22 at a desired off-axis angle. This configuration has the advantage that it reduces the amount of fiber bending. In an example, the support edge 24 can include a number of angled sections as shown.

With reference now to FIG. 12C, the example blade 510 disclosed therein is similar to that shown in FIG. 12A except that it includes a large cut-out 515 at the edge 526 that defines a relatively narrow angled and thin strut 525. The strut 525 includes the fiber support edge 524 and extends from the proximal section 511 generally in the −y direction. The strut 525 includes the distal end 532 while the wider proximal section 511 includes the mounting feature 570 as shown. A variety of other shapes and configurations for the blade 510 can also be employed so long as a relatively low profile (i.e., small thickness TH) is maintained to keep light loss due to light blocking to a minimum (e.g., a few percent or less).

Figure 14F:
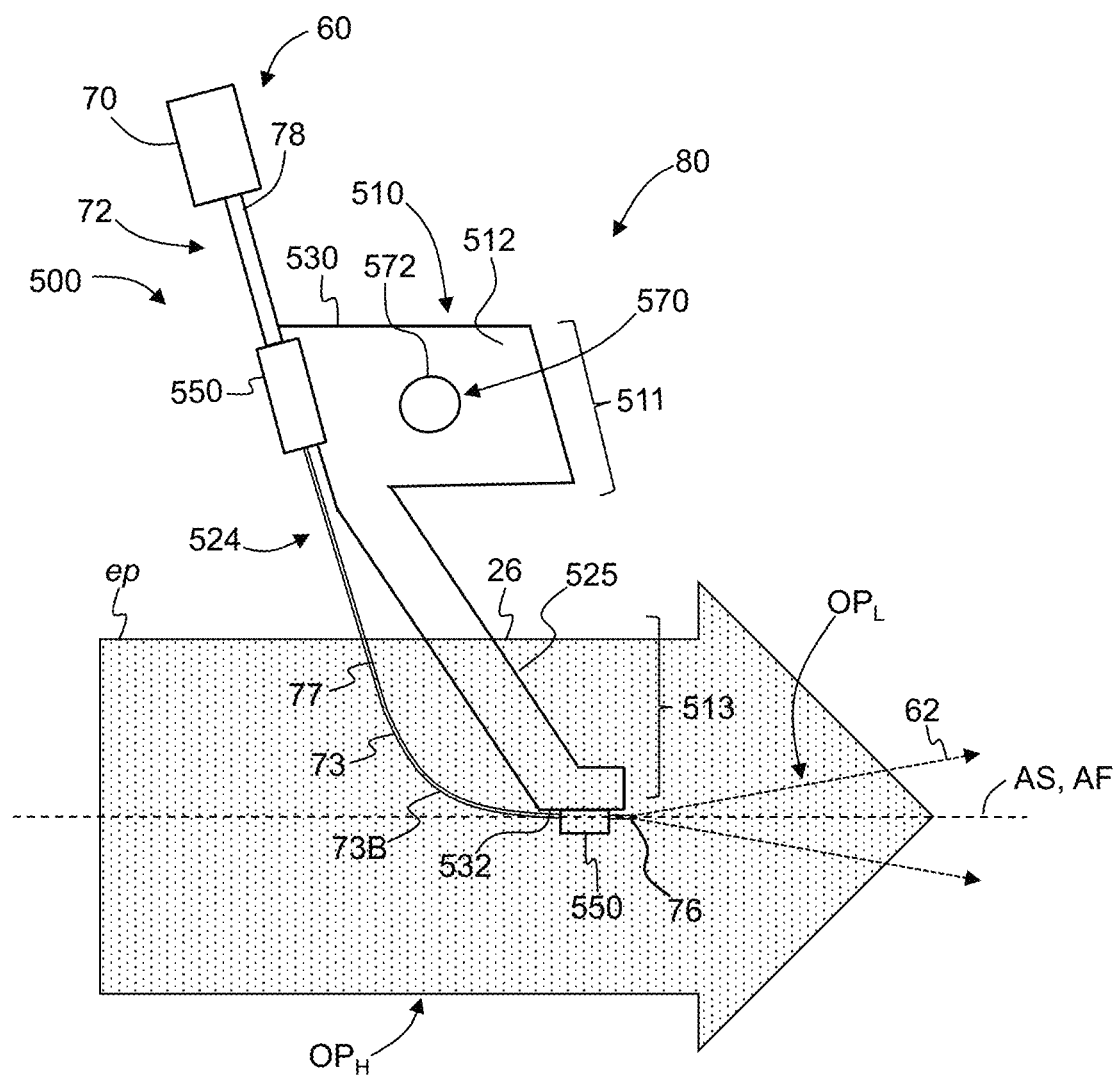

FIG. 14F is similar to FIG. 14E and illustrates an aspect of the LE light source assembly 80 wherein the blade 510 includes the strut 525 similar to that shown in FIG. 12C, but wherein the blade has more of an angled fiber support edge 524, such as shown in FIG. 14D.

Figure 15A:
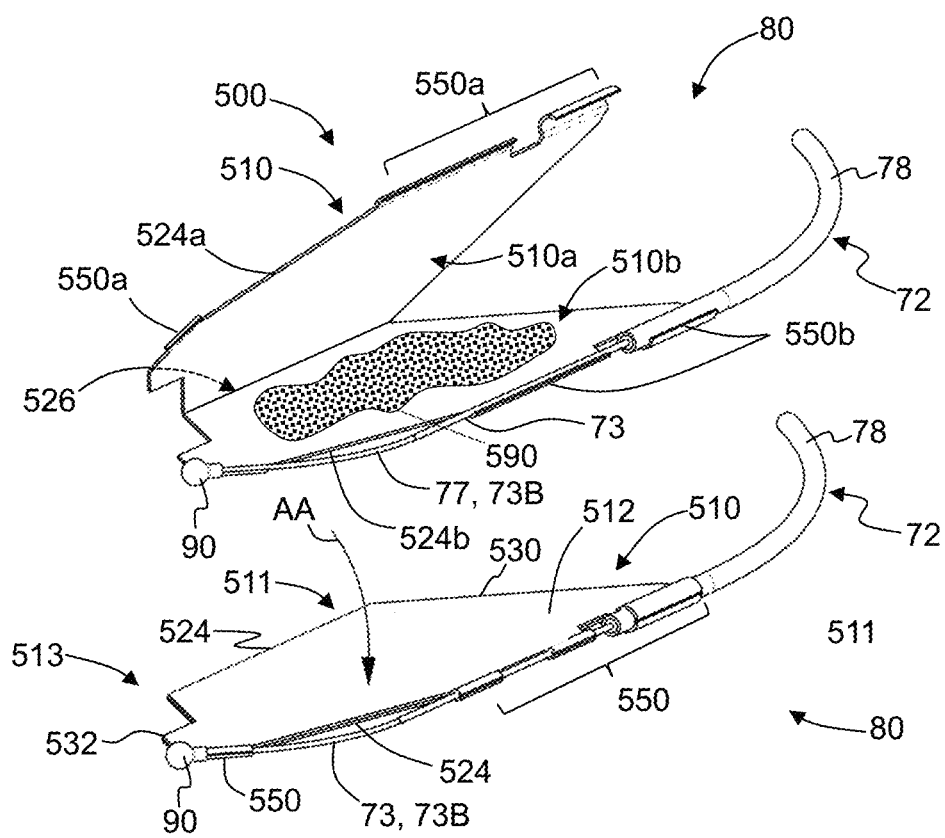
FIG. 15A is an elevated view of an example LE light source assembly wherein the support structure comprises two halves that are folded together.
Figure 15B:
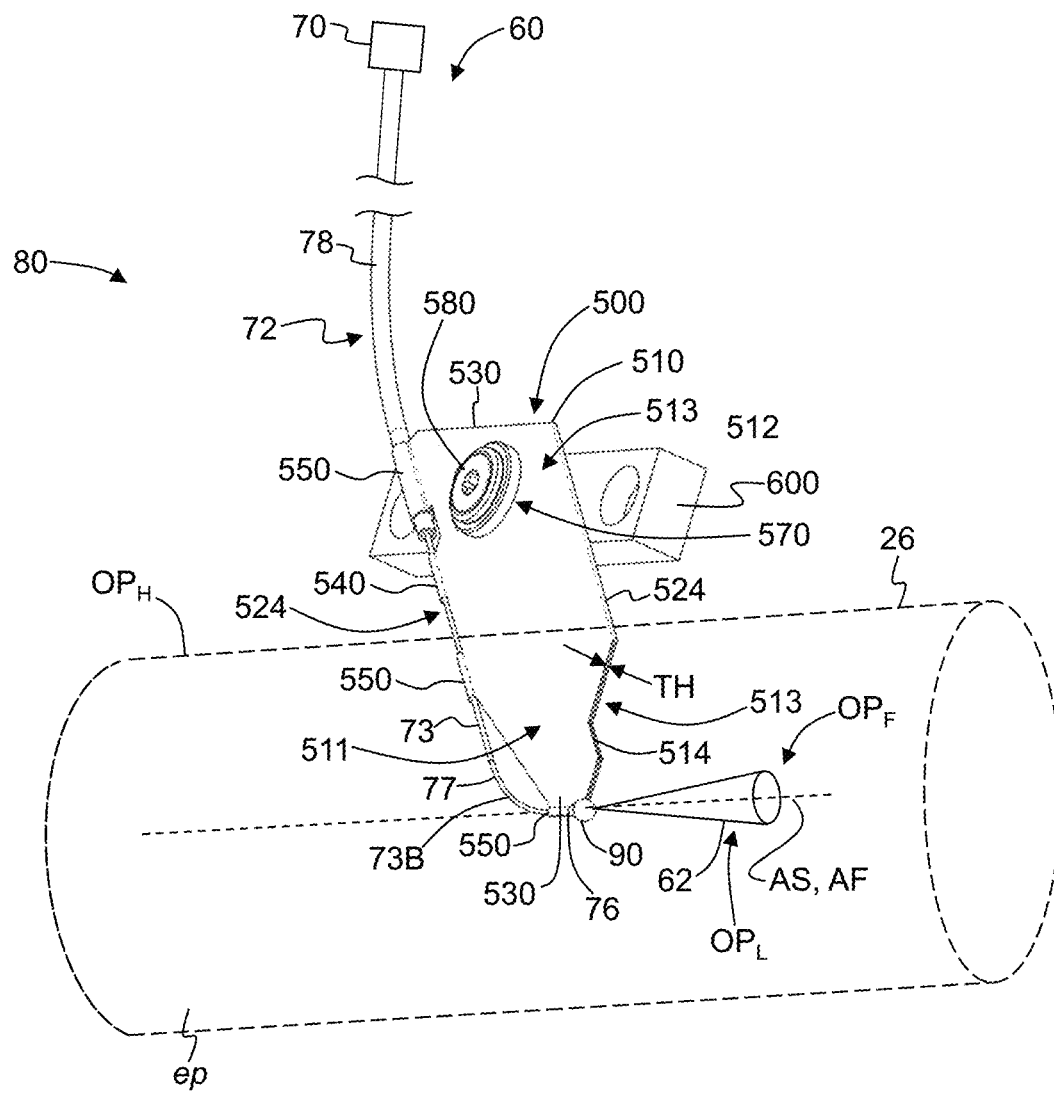
FIG. 15B is an elevated view of the example LE light source assembly of FIG. 15B showing the support structure mounted to a mounting structure and showing the distal section of the support structure residing within the HE optical path.

FIG. 15A and FIG. 15B are elevated views that illustrate another example LE light source assembly 80. With reference first to the upper part of FIG. 15A, the blade 510 of the LE support structure 500 is formed by folding over first and second plate halves 510a and 510b, which are joined (e.g., sealed or hinged) at a common back edge 526. A securing material 590 can be placed between the first and second plate halves 510a and 510b and then the plate halves folded onto themselves (as indicated by the fold arrow AA) to form the final blade 510, as shown in the lower part of FIG. 15A. The first and second plate halves 510a and 510b can also be secured using other means known in the art. The securing features 550 are also formed in two halves, denoted 550a and 550b, which come together to hold the fiber 72 when the first and second plate halves 510a and 510b are folded together.

FIG. 15B shows the example LE light source assembly 80 of FIG. 15A operably supported by the support mount 600 using the securing feature 680. The LE light source assembly 80 places the distal section 511 of the blade 510 into the HE optical path $OP_H$ so that the fiber end face 76 resides at a select location within the HE optical path.

Figure 16A:
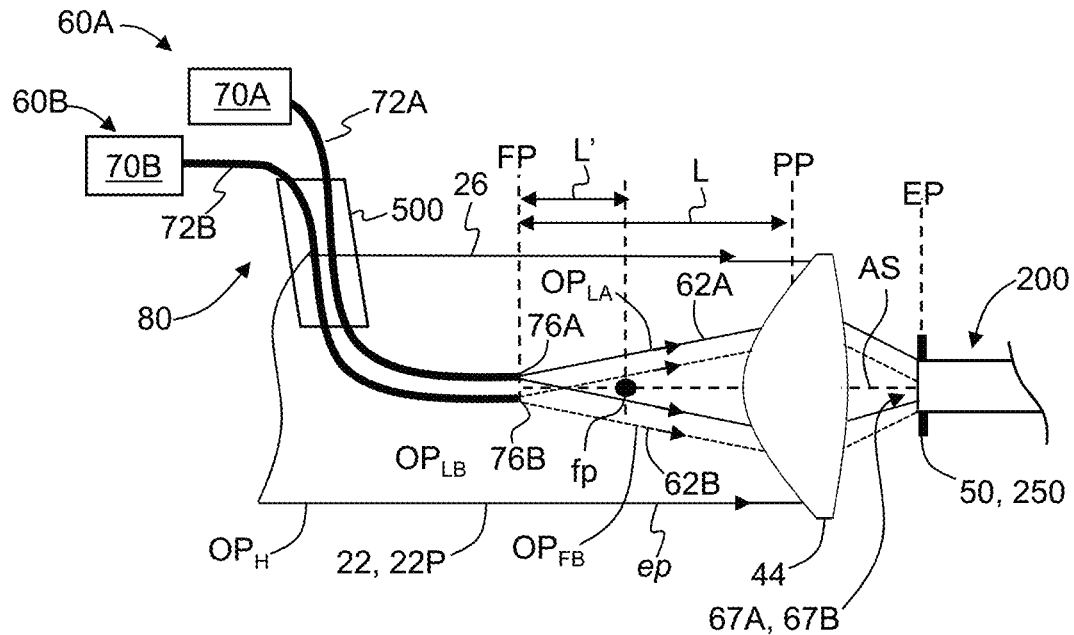
FIG. 16A is a close-up schematic diagram of a portion of the HE optical system near the condenser optical system showing an example configuration of how two fiber light sources can be configured in a LE light source assembly to place their respective fiber end faces in the HE optical path.
Figure 16B:
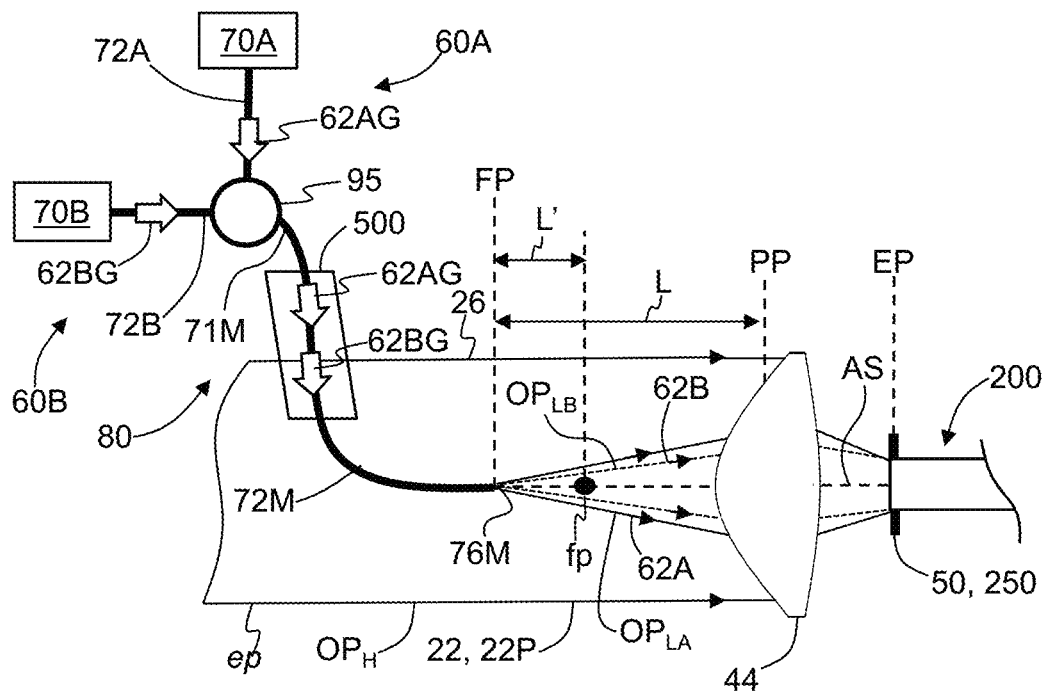
FIG. 16B is a close-up schematic diagram of a portion of the HE optical system near the condenser optical system showing an example configuration of how two fiber light sources can be combined (multiplexed) into a single optical fiber supported in a LE light source assembly.

FIG. 16A is a close-up schematic diagram of a portion of the HE optical system 45 showing an example configuration of how two fiber light sources 60A and 60B can be configured in a LE light source assembly 80 to place their respective fiber end faces 76A and 76B in HE optical path $OP_H$ and in the particular example shown in the same fiber plane FP. In FIG. 16A, the two fibers 72A and 72B are supported by the LE support structure 500 so that their respective end faces 76A and 76B reside at the same fiber plane FP but are offset relative to each other, e.g., on opposite sides of the axis AS. The corresponding LE light beams 62A and 62B are received and directed by the condenser optical system 44 to the exit plane EP, with their respective fiber light distributions 67A and 67B overlapping but also slightly offset from one another, as illustrated in the idealized schematic diagram in the close-up inset of the exit aperture 50. The amount of offset in the fiber light distributions 67A and 67B is a function of the separation of the fiber end faces 76A and 76B at the fiber plane FP. In some variations the amount of offset in the fiber light distributions 67A and 67B may be reduced by positioning one or both of the fiber end faces 76A and 76B at a slight angle with respect to axis AS.

Positioning the LE Light Beam in the HE Light Beam

Positioning the LE light beam 62 within the expanded portion 22P of the HE light beam 22 may be done on the basis of trying to match a desired low etendue light distribution at the exit plane EP, or at a further downstream position. For example, the LE light distribution may be controlled to attempt to match the HE light distribution at the exit plane EP or at a downstream position after all light guides, channels and etendue gates in the illumination path. Additionally or alternatively, the LE light distribution may be controlled to try to fill the aperture of any etendue gate in the system. Additionally or alternatively, the LE light distribution may be controlled to avoid underfilling the aperture and to avoid underfilling the solid angle of any etendue gate in the system.

Determining an appropriate position for introducing the LE light beam 62 with respect to the condenser optical system 44 can be done empirically using general principles of optics known and understood by one skilled in the art and may depend on the optical power and diameter of the one or more optics in the collector optical system 40, the numerical aperture and intensity distribution of the LE light beam 62 at the point of emission within the HE light beam 22, and the control conditions placed on the downstream LE light distribution, such as one or more of the control conditions discussed herein.

Adjustment of the beam divergence of the LE light beam 62 may also be performed to assist with meeting the control conditions placed on the downstream LE light distribution. For example, if the numerical aperture and corresponding beam divergence of the LE light beam 62 is too high, the LE light beam may be condensed to become less divergent upstream of the condenser optical system 44. Alternatively, if the numerical aperture and corresponding beam divergence of the LE light beam 62 is too low, the LE light beam may be expanded to become more divergent upstream of the condenser optical system 44. Adjustments for either condensing or expanding the LE light beam 62 may be achieved with the use of one or more optically powered surfaces, such as for example adjustment of the optical power of the fiber end face 76 of LE optical fiber 72, or use of an optical component 90 (for example, a microlens) as described herein.

As an example of determining positioning of a LE light beam, the acceptable range of position of the end face 76 of the LE optical fiber 72 in order to achieve satisfactory performance was characterized experimentally using a system 10 based on that shown in FIG. 11A as described herein.

Satisfactory LE light performance was assessed for each of the criteria of acceptable fill of input aperture, acceptable total flux through input aperture, and acceptable far-field illumination distribution. In the experimental setup, the LE light beam 62A having a numerical aperture of about 0.15 travels through the condenser optical system 44 that focusses the LE light into an optical fiber bundle that delivers the light to an endoscope. The far-field LE illumination distribution was assessed by pointing the endoscope at a perpendicular white surface spaced 175 mm from the distal tip of the endoscope, imaging the resulting LE illumination distribution on the wall with a separate rigidly mounted camera, and analyzing the distribution by extracting a lineout through the center of the distribution from the camera image. Positioning of the LE optical fiber 72 was measured relative to the nearest vertex V of the single aspherical optical element of the condenser optical system 44.

Assessment criteria were evaluated at a range of separation distances SD between the end face 76 of the LE optical fiber 72 and the near vertex V of condenser optical system 44 as shown in FIG. 17, with nominal alignment observed to be at a separation distance SD of about 73 mm. Separation distances SD of between 40 and 82 mm yielded acceptable flux through the light guide input aperture, while separation distances SD of up to 80 mm yielded acceptable fill of the input aperture. The far-field LE illumination distribution was assessed for a range of separation distances from 48 to 95 mm, but there was no noticeable effect on the shape of the distribution from changing separation distance or from steering the fiber end face 76 by 1.5 degrees away from the axis AS. Steering the fiber end face 76 by about 2 degrees away from the axis AS was found to reduce the flux through the output aperture by about 10%. It is noted that the separation distance SD is equivalent to the aforementioned fiber distances L and L' and each can be determined from the other given the optical parameters of the condenser optical system 44. Note that in this and other likely examples to be employed in the field based on the disclosure set forth herein, the end face 76 of the light guide can be axially spaced apart from the collector optical system 20 (in the direction toward the condenser optical system) by a substantial portion of the total axial distance AXD between the collector and condenser optical systems, depending on the particular configuration of the collector and condenser optical systems. In an example, this distance is at least 0.25·AXD. Such spacing may not only be preferable but may be required for satisfactory system functionality.

Figure 18:
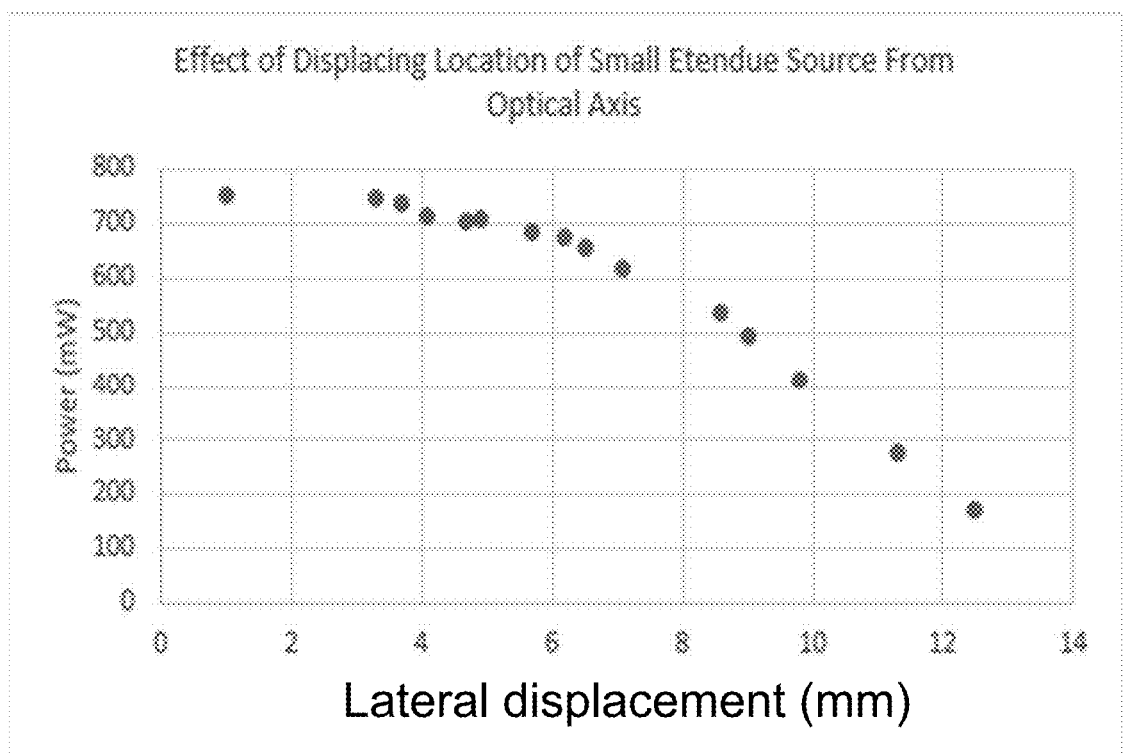
FIG. 18 is a plot of the effect on power output from downstream light guide of displacing the location of the low etendue beam source from the optical axis as measured experimentally.

The ability to compensate for loss in coupling efficiency when a LE light beam 62 is introduced at a displaced position relative to the optical axis of the HE light beam 22 by steering the source of the LE light beam was also tested experimentally. A 665 nm laser was used as the LE source 60 for the experimental testing, with nominal output power as measured from the output of a downstream light guide of 765 mW at zero lateral displacement of the fiber end face 76 of LE optical fiber 72 from the system main axis AS. Measurements of output power were made over a range of lateral displacements of the fiber end face 76, with the LE light beam 62 steered by adjusting the angle of the fiber end face to maximize the output power at each displaced position. As seen in the plot of output power measurements shown in FIG. 18, the loss in output power was observed to be minimal with increasing lateral displacement from the main system axis AS up to a displacement of about 6 mm, after which the loss with increasing lateral displacement was more pronounced. Loss in output power was less than about 10% of the nominal output power for lateral displacements of up to about 5 mm from the optical axis.

Fluorescence imaging as referred to herein can be generated by fluorescence imaging technologies employing a fluorescence imaging agent such as, for example, indocyanine green (ICG) dye as a fluorescence imaging agent. ICG, when administered to the subject, binds with blood proteins and circulates with the blood in the tissue. Although reference is made in the specification to a fluorescence agent or a fluorescence dye, other suitable imaging agents may be used depending on the type of imaging technology being employed to generate the time series of images.

In some variations, a suitable fluorescence imaging agent is an agent which can circulate with the blood (e.g., a fluorescence dye which can circulate with a component of the blood such as lipoproteins or serum plasma in the blood) and which fluoresces when exposed to appropriate excitation light energy. The fluorescence imaging agent may comprise a fluorescence dye, an analogue thereof, a derivative thereof, or a combination of these. A fluorescence dye may include any non-toxic fluorescence dye. In some variations, the fluorescence imaging agent optimally emits fluorescence in the near-infrared spectrum. In some variations, the fluorescence imaging agent is or comprises a tricarbocyanine dye such as, for example, indocyanine green (ICG). In other variations, the fluorescence imaging agent is or comprises fluorescein isothiocyanate, rhodamine, phycoerythrin, phycocyanin, allophycocyanin, o-phthaldehyde, fluorescamine, rose Bengal, trypan blue, fluoro-gold, green fluorescence protein, flavins (e.g., riboflavin, etc.), methylene blue, porphysomes, cyanine dyes (e.g., cathepsin-activated Cy5 combined with a targeting ligand, Cy5.5, etc.), IRDye800CW, ALM-488, GE3126, Nervelight™, CLR 1502 combined with a targeting ligand, OTL38 combined with a targeting ligand, or a combination thereof, which is excitable using excitation light wavelengths appropriate to each imaging agent. In some variations, an analogue or a derivative of the fluorescence imaging agent may be used. For example, a fluorescence dye analogue or a derivative may include a fluorescence dye that has been chemically modified, but still retains its ability to fluoresce when exposed to light energy of an appropriate wavelength. In variations in which some or all of the fluorescence is derived from autofluorescence, one or more of the fluorophores giving rise to the autofluorescence may be an endogenous tissue fluorophore (e.g., collagen, elastin, NADH, etc.), 5-aminolevulinic Acid (5-ALA), or a combination thereof.

In some variations of the systems described here, at least one of the light engine illumination wavebands may correspond to one or more excitation wavebands for excitation of a fluorophore and may be centered at about 405 nm, about 465 nm, centered anywhere within the range of about 460-490 nm, about 660 nm, centered anywhere within the range of about 760-780 nm, about 805 nm, or centered anywhere within the range of about 750-810 nm. The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description features are described herein as part of the same or separate embodiments, however, it will be appreciated that the scope of the invention may include embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

What is claimed is:

1. A light engine for generating a combined light beam, comprising:
   a) a first light source having an emission surface and a first etendue and configured to emit a diverging first light beam;
   b) a collector optical system arranged to receive the diverging first light beam and form therefrom an expanded first light beam that travels over a first expanded optical path that includes a periphery;
   c) a second light source having a second etendue that is less than one tenth of the first etendue and that is configured to form second light;
   d) a light guide having a proximal end section in optical communication with the first light source and having a distal end section that enters the first expanded optical path through the periphery, the distal end section having an end face, the light guide configured to conduct the second light from the second light source and emit the second light from the end face as a second light beam that travels over a second optical path that resides within the periphery of the first expanded optical path of the first light beam without passing either the second light or the second light beam through an aperture in a light redirecting element; and
   e) an optical condenser configured to receive and direct the first light beam and the second light beam to a common exit plane to form the combined light beam.

2. The light engine of claim 1, wherein the common exit plane comprises an exit aperture.

3. The light engine of claim 1, wherein the light guide comprises an optical fiber.

4. The light engine of claim 1, wherein the light guide comprises a prism.

5. The light engine of claim 1, wherein the light guide comprises a light pipe.

6. The light engine of claim 1, wherein the expanded optical path resides along a first axis and the light guide intersects the first optical path from an off-axis direction relative to the first axis.

7. The light engine of claim 1, wherein the light guide comprises an optical fiber having a distal fiber section, wherein the end face comprises a fiber end face, and further comprising a support structure that operably supports at least the distal fiber section of the optical fiber so that the fiber end face resides within the first optical path.

8. The light engine of claim 7, wherein the support structure blocks less than 3% of the first light beam.

9. The light engine of claim 7, wherein the support structure comprises a thin planar support member having a fiber support edge and defining a plane and wherein the optical fiber is supported at or proximate to the fiber support edge and resides within the plane.

10. The light engine of claim 9, wherein the optical fiber has a diameter and wherein the thin planar support member has a width the same as or less than the diameter of the optical fiber.

11. The light engine of claim 7, wherein the support structure maintains a bend in the optical fiber.

12. The light engine of claim 7, wherein the support structure is adjustable to adjust at least one of a position and an orientation of the fiber end face within the first optical path.

13. The light engine of claim 1, wherein the fiber end face resides on the first axis and faces the optical condenser.

14. The light engine of claim 1, wherein the second light beam emitted from the end face has a first beam angle and further comprising an optical component that resides at or proximate the end face and that is configured to change the first beam angle.

15. The light engine of claim 1, wherein the first and second light beams have respective first and second wavelength bands, and wherein the first and second wavelength bands are non-overlapping.

16. The light engine of claim 1, wherein the collector optical system and condenser optical system are axially spaced apart by an axial distance AXD, and wherein the end face of the distal section of the light guide resides between the collector optical system and the condenser optical system and is axially spaced apart from the collector optical system by an axial distance of at least $0.25 \cdot AXD$.

17. A light engine for generating a combined light beam, comprising:
   a) a first light source having a first etendue and an emission surface and configured to introduce a first light beam to travel along at least a first axis and along a first optical path having an expanded portion;
   b) a second light source having a second etendue that is less than one tenth of the first etendue and that is configured to form second light;
   c) a light guide having a distal section with an end face and configured to conduct the second light and emit the second light from the end face as a second light beam, wherein the second light beam is introduced to travel over a second optical path that resides within the expanded portion of the first optical path of the first light beam by the light guide being disposed relative to the first optical path and in an off-axis direction relative to the first axis; and
   d) an optical condenser configured to receive and direct the first light beam and the second light beam to a common exit plane to form the combined light beam.

* * * * *